(12) United States Patent
Nakasaka et al.

(10) Patent No.: US 7,159,547 B2
(45) Date of Patent: Jan. 9, 2007

(54) CONTROL APPARATUS FOR MULTI-CYLINDER INTERNAL COMBUSTION ENGINE AND CONTROL METHOD

(75) Inventors: Yukihiro Nakasaka, Susono (JP); Toshiaki Asada, Mishima (JP); Naohide Fuwa, Susono (JP); Shinji Sadakane, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/439,958

(22) Filed: May 25, 2006

(65) Prior Publication Data

US 2006/0207582 A1   Sep. 21, 2006

Related U.S. Application Data

(62) Division of application No. 10/058,305, filed on Jan. 30, 2002, now Pat. No. 7,073,493.

(30) Foreign Application Priority Data

Feb. 5, 2001 (JP) ............................. 2001-28685
May 31, 2001 (JP) ............................ 2001-165247

(51) Int. Cl.
*F02D 41/00* (2006.01)
*G06F 17/00* (2006.01)

(52) U.S. Cl. .................. 123/90.15; 123/345; 123/673; 123/691; 123/399; 701/103; 701/109; 60/285

(58) Field of Classification Search ................ 123/673, 123/90.15, 345–348, 399, 691, 568.14; 60/276, 60/285; 701/103–105, 108–109
See application file for complete search history.

(56) References Cited

U.S. PATENT DOCUMENTS

| 5,115,782 | A  | 5/1992  | Klinke et al.   |
| 5,377,654 | A  | 1/1995  | LoRusso et al.  |
| 6,148,791 | A  | 11/2000 | Fujieda et al.  |
| 6,234,144 | B1 | 5/2001  | Yamaguchi et al.|
| 6,244,241 | B1 | 6/2001  | Mamiya et al.   |
| 6,286,478 | B1 | 9/2001  | Atago et al.    |
| 6,343,585 | B1 | 2/2002  | Fujieda et al.  |
| 6,453,871 | B1 | 9/2002  | Fujieda et al.  |

(Continued)

FOREIGN PATENT DOCUMENTS

DE   44 08 880 A1   9/1995

(Continued)

*Primary Examiner*—Hai Huynh
(74) *Attorney, Agent, or Firm*—Oliff & Berridge PLC

(57) ABSTRACT

A control apparatus calculates a exhaust gas air-fuel ratio of a plurality of cylinders, in which the operation angle of an intake valve is set to a predetermined operation angle, e.g., a maximum operation angle, based on a value output from an air-fuel ratio sensor so as to minimize a variation in an fuel injection quantity between the plurality of cylinders by that exhaust gas air-fuel ratio. That is, the exhaust gas air-fuel ratio of the plurality of cylinders, in which the valve opening characteristics of the intake valve and an exhaust valve are set such that the intake air amount to be introduced into the plurality of cylinders is limited by the opening amount of a throttle valve, for example, and not limited by the valve opening characteristics of the intake valve or the exhaust valve is calculated, and the variation in the fuel injection quantity among the plurality of cylinders is then reduced by that exhaust gas air-fuel ratio. Then, the variation in valve opening characteristics among the cylinders is reduced.

19 Claims, 21 Drawing Sheets

U.S. PATENT DOCUMENTS

| | | | |
|---|---|---|---|
| 6,474,308 B1 * | 11/2002 | Okumura et al. | 123/491 |
| 6,564,763 B1 | 5/2003 | Shiraishi et al. | |
| 6,880,329 B1 * | 4/2005 | Iida et al. | 60/285 |
| 2001/0045194 A1 | 11/2001 | Shiraishi et al. | |
| 2002/0017256 A1 | 2/2002 | Shiraishi et al. | |
| 2004/0231624 A1 | 11/2004 | Shindou et al. | |
| 2005/0022797 A1 * | 2/2005 | Ikemoto et al. | 123/673 |
| 2005/0217620 A1 | 10/2005 | Shindou | |

FOREIGN PATENT DOCUMENTS

| | | | |
|---|---|---|---|
| EP | 0 433 632 A1 | | 6/1991 |
| EP | 1 063 407 A1 | | 12/2000 |
| EP | 1229230 | * | 8/2002 |
| JP | A 59-101562 | | 6/1984 |
| JP | A 1-142238 | | 6/1989 |
| JP | A 5-180040 | | 7/1993 |
| JP | A 6-213044 | | 8/1994 |
| JP | A 9-88685 | | 3/1997 |
| JP | A 9-96236 | | 4/1997 |
| JP | A 2000-161085 | | 6/2000 |
| JP | 2002-303187 | * | 10/2002 |
| JP | 2004-132314 | | 4/2004 |
| JP | 2005-220925 | * | 8/2005 |
| WO | WO99/47800 | | 9/1999 |
| WO | WO 01/04465 A1 | | 1/2001 |

* cited by examiner

CONTROL APPARATUS FOR MULTI-CYLINDER INTERNAL COMBUSTION ENGINE AND CONTROL METHOD

INCORPORATION BY REFERENCE

This is a Division of application Ser. No. 10/058,305 filed Jan. 30, 2002 now U.S. Pat. No. 7,073,493. The disclosure of the prior application is hereby incorporated by reference herein in its entirety. The disclosures of Japanese Patent Applications No. 2001-165247 filed on May 31, 2001, and No. 2001-028685 filed on Feb. 5, 2001, including their specifications, drawings and abstracts are incorporated herein by reference in their entireties.

BACKGROUND OF THE INVENTION

1. Field of Invention

The invention relates generally to control apparatus and methods for a multi-cylinder internal combustion engine.

2. Description of Related Art

Conventionally, a control apparatus for a multi-cylinder internal combustion engine, which reduces variation in the air-fuel ratio between cylinders is known. An example of this type of control apparatus is disclosed in Japanese Patent Application Laid-Open Publication No. 6-213044. The control apparatus disclosed in this publication calculates the air-fuel ratio of each of a plurality of cylinders based on a value output from an air-fuel sensor. Any variation in the air-fuel ratios between the cylinders is then minimized by controlling the valve lift amount of each of the cylinders.

Variation in the fuel injection quantity between cylinders, however, may lead to a variation in torque between the cylinders, which may result in pulsation. With the control apparatus disclosed in the above-mentioned publication, it is possible that, even if a variation in air-fuel ratio between the cylinders is minimized, a variation in torque may still occur between the cylinders.

Further in the control apparatus disclosed in the foregoing publication, although variation in the air-fuel ratio between the cylinders is minimized by controlling the valve lift amount, the publication discloses nothing about how to control the variation in air-fuel ratio between the cylinders in the event that the amount of valve overlap of the intake valve and the exhaust valve can be changed. Moreover, the publication discloses nothing about how to control the variation in the air-fuel ratio between the cylinders in the event that the operation angle of the intake valve can be changed. Therefore, variation in the air-fuel ratio between the cylinders with this control apparatus is not able to be appropriately controlled both in the case where the amount of the valve overlap of the intake valve and the exhaust valve is able to be changed, and in the case where the operation angle of the intake valve is able to be changed.

SUMMARY OF THE INVENTION

In view of the foregoing problems, it is one object of the invention to provide a control apparatus for a multi-cylinder internal combustion engine, which is capable of minimizing both a variation in the air-fuel ratio between the cylinders as well as a variation in torque between the cylinders.

It is a further object of the invention to provide a control apparatus for a multi-cylinder internal combustion engine, which is capable of appropriately controlling the variation in the air-fuel ratio between the cylinders. More specifically, it is an object of the invention to provide a control apparatus for a multi-cylinder internal combustion engine, which is capable of appropriately controlling the variation in air-fuel ratio between the cylinders both when the amount of valve overlap of the intake valve and the exhaust valve can be changed, as well as when the operation angle of the intake valve can be changed.

A still further object of the invention is to provide a control apparatus for a multi-cylinder internal combustion engine in which a target air-fuel ratio value is able to be changed to a more appropriate value based on the operation angle of the intake valve than when the target air-fuel ratio is not corrected based on the operation angle of the intake valve. That is, it is an object of the invention is to provide a control apparatus for a multi-cylinder internal combustion engine, which is capable of executing appropriate air-fuel ratio feedback control even when a sensor is not sufficiently exposed to an exhaust gas, i.e., even when a target air-fuel ratio calculated from a value output by a sensor is not an appropriate target air-fuel ratio.

According to one aspect of the invention, a control apparatus for a multi-cylinder internal combustion engine including a plurality of cylinders is provided with a controller that calculates an exhaust gas air-fuel ratio of a cylinder when valve opening characteristics of an intake valve and an exhaust valve of each of the cylinders of the internal combustion engine are set such that an amount of an intake air introduced into the cylinder is not limited by the valve opening characteristics; and reduces a variation in a fuel injection quantity among the cylinders on the basis of the calculated exhaust gas air-fuel ratio of each of the cylinders.

In the control apparatus, the controller calculates the exhaust gas air-fuel ratio of each of the cylinders when the valve opening characteristics of the intake valve and the exhaust valve of the cylinder are set such that the amount of the intake air introduced into each of the cylinders of the internal combustion engine is limited by a throttle valve opening amount.

In the control apparatus, when the valve opening characteristics of the intake valve and the exhaust valve of the cylinder are set so as not to limit the quantity of air introduced into the cylinder, the exhaust gas air-fuel ratio of the cylinder is calculated. Preferably, when the valve opening characteristics of the intake valve and the exhaust valve of the cylinder are set such that the quantity of air introduced into the cylinder is limited by the throttle valve opening amount and not limited by the valve opening characteristics, the exhaust gas air-fuel ratio of the cylinder is calculated. In order to calculate an exhaust gas air-fuel ratio of each of the cylinders, the valve opening characteristics of the intake valve and the exhaust valve of the cylinder are set such that quantity of the intake air introduced into the cylinder is limited by the throttle valve opening amount and not limited by the valve opening characteristics of the intake and exhaust valves of the cylinder. In other words, the throttle valve opening amount of one cylinder upon calculation of the exhaust gas air-fuel ratio of the cylinder is made substantially equivalent to that of an other cylinder upon calculation of the exhaust gas air-fuel ratio of the other cylinder so as to make the quantity of the intake air introduced into the one cylinder upon calculation of the exhaust gas air-fuel ratio of the one cylinder equivalent to that of the other cylinder. Further in the invention, the amount of the intake air introduced into one cylinder upon calculation of the exhaust gas air-fuel ratio of the cylinder is made equivalent to that of the exhaust gas air fuel ratio of the other cylinder so as to obtain the exhaust gas air-fuel ratio of the cylinder. As a result, a variation in the fuel injection amount among the cylinders can be reduced on the basis of the exhaust gas air-fuel ratio. Accordingly, each amount of the intake air introduced into each of the cylinders is made equivalent, and then the respective fuel injection quantity is corrected so as to make each exhaust gas air-fuel ratio of the cylinders equivalent. Unlike the control apparatus disclosed in Japanese Patent Application Laid-Open Publication No. 6-213044, the variation in the air-fuel ratio among the cylinders is reduced while controlling a variation in torque among the cylinders when there is variation in the fuel injection quantity among the cylinders, thus preventing pulsation. That is, the control apparatus of this aspect of the invention reduces a variation in the air-fuel ratio among the cylinders as well as a variation in torque among the cylinders.

According to another aspect of the invention, a control apparatus for a multi-cylinder internal combustion engine including a plurality of cylinders is provided with a controller that calculates an exhaust gas air-fuel ratio of each of the cylinders when an operation angle of an intake valve of each of the cylinders of the internal combustion engine is set to a predetermined angle, and reduces a variation in a fuel injection quantity among the cylinders on the basis of the calculated exhaust gas air-fuel ratio of each of the cylinders.

In the control apparatus, the controller calculates the exhaust gas air-fuel ratio of each of the cylinders when the operation angle of the intake valve is set such that an amount of intake air introduced into a cylinder of the internal combustion engine is not limited by the operation angle of the intake valve.

In the control apparatus, the controller calculates an exhaust gas air-fuel ratio of each of the cylinders when the amount of the intake air introduced into each of the cylinders of the internal combustion engine is not limited by the operation angle of the intake valve, but is limited by a throttle valve opening amount.

In the control apparatus, the controller calculates the exhaust gas air-fuel ratio of each of the cylinders when the operation angle of the intake valve is set to a maximum operating angle.

In the control apparatus according to another aspect of the invention, when the operation angle of the intake valve of a cylinder is set to a predetermined angle, the exhaust gas air-fuel ratio of the cylinder is calculated. More specifically, in the control apparatus, the operation angle of the intake valve is set so as not to limit the amount of intake air introduced into the cylinder, and then the exhaust gas air-fuel ratio of that cylinder is calculated. Preferably in the control apparatus, the operation angle of the intake valve is set such that the amount of the intake air introduced into a cylinder is limited by a throttle valve opening amount, and is not limited by the operation angle of the intake valve, and the exhaust gas air-fuel ratio of the cylinder is calculated. More preferably, the operation angle of the intake valve of a cylinder is set to a maximum angle, and the exhaust gas air-fuel ratio of that cylinder is calculated. That is, the amount of the intake air introduced into the cylinder is limited by the throttle valve opening amount, and is not limited by the operation angle of the intake valve set to a maximum angle in order to calculate the exhaust gas air-fuel ratio of that cylinder. More specifically, the amount of the intake air introduced into one cylinder upon calculation of the exhaust gas air-fuel ratio of that cylinder can be made equivalent to that of an other cylinder by making the throttle valve opening amount obtained upon calculation of the exhaust gas air-fuel ratio of the one cylinder substantially equivalent to that of the other cylinder.

In the control apparatus, the amount of the intake air introduced into one cylinder upon calculation of the exhaust gas air-fuel ratio of that cylinder is made equivalent to that of the other cylinder such that a variation in the fuel injection quantity can be minimized on the basis of the calculated exhaust gas air-fuel ratio. Accordingly, the amount of the intake air introduced to each of the cylinders is made equivalent and the fuel injection quantity is corrected so as to make the exhaust gas air-fuel ratio of each of the cylinders equivalent. Unlike the control apparatus disclosed in Japanese Patent Application Laid-Open Publication No. 6-213044, the variation in the air-fuel ratio among the cylinders can be reduced while controlling a variation in the torque among the cylinders in the presence of the variation in the fuel injection quantity among the cylinders, thus preventing pulsation. Accordingly, the variation both in the air-fuel ratio and in the torque among the cylinders can be reduced.

According to another aspect of the invention, a control apparatus for a multi-cylinder internal combustion engine is provided with a controller that calculates an exhaust gas air-fuel ratio of each of the cylinders when a valve overlap amount of an intake valve and an exhaust valve of each of the cylinders of the internal combustion engine is set to a predetermined amount, and reduces a variation in a fuel injection quantity among the plurality of cylinders on the basis of the calculated exhaust gas air-fuel ratio of each of the cylinders.

In the control apparatus, the controller calculates the exhaust gas air-fuel ratio of each of the cylinders when the valve overlap amount of the intake valve and the exhaust valve is set such that an amount of the intake air introduced into the cylinders is not limited by the valve overlap amount.

In the control apparatus, the controller calculates the exhaust gas air-fuel ratio of each of the cylinders when the valve overlap amount of the intake valve and the exhaust valve is set such that the amount of the intake air introduced into the cylinders is not limited by the valve overlap amount, but is limited by a throttle valve opening amount.

In the control apparatus, the controller calculates the exhaust gas air-fuel ratio of each of the cylinders when the valve overlap amount of the intake valve and the exhaust valve is set to a minimum amount.

In the control apparatus according to another aspect of the invention, an exhaust gas air-fuel ratio of each of the cylinders is calculated in which a valve overlap amount of the intake valve and the exhaust valve is set to a predetermined amount. More specifically, the control apparatus calculates the exhaust gas air-fuel ratio of each of the cylinders in which the overlap amount of the intake valve and the exhaust valve is set so as not to limit the quantity of air introduced into the cylinders. Preferably, the control apparatus calculates the exhaust gas air-fuel ratio of each of the cylinders in which the valve overlap amount of the intake valve and the exhaust valve is set such that the intake air amount introduced into the cylinders is limited by the throttle valve opening amount, and is not limited by the valve overlap amount of the intake valve and the exhaust valve. Most preferably, the control apparatus calculates the exhaust gas air-fuel ratio of each of the cylinders in which the valve overlap amount of the intake valve and the exhaust valve is set to a minimum valve overlap amount. That is, the control apparatus calculates the exhaust gas air-fuel ratio of a certain cylinder, when the valve overlap amount of the intake valve and the exhaust valve is set to the minimum amount so that the intake air amount introduced into that cylinder is limited by the throttle valve opening amount, and is not limited by the valve overlap amount. In other words, the intake air amount into a cylinder upon calculation of the exhaust gas air-fuel ratio of the cylinder is made equivalent to that of the other cylinder by making the throttle valve opening amount upon calculation of the exhaust gas air-fuel ratio of a cylinder substantially equivalent to that of the other cylinder. In the control apparatus, the variation in the fuel injection quantity among cylinders can be reduced by making the intake air amount into a cylinder upon calculation of the exhaust gas air-fuel ratio of the cylinder equivalent to that of the other cylinder. In other words, the intake air amount of all cylinders is made equivalent and the fuel injection quantity is corrected so as to make all the exhaust gas air-fuel ratios of the cylinders equivalent. Unlike Japanese Patent Application Laid-Open Publication No. 6-213044, the variation in the air-fuel ratio among the cylinders can be reduced while reducing the variation in the torque among the cylinders in the presence of the variation in the fuel injection quantity among the cylinders, thus preventing pulsation. More specifically, the control apparatus is capable of minimizing the variation both in the air-fuel ratio and the torque among the cylinders.

In the control apparatus according to another aspect of the invention, the controller calculates an exhaust gas air-fuel ratio of each of the cylinders when the valve opening characteristics of the intake valve and the exhaust valve are set such that the amount of the intake air introduced into the cylinder is limited by the valve opening characteristics after reducing the variation in the fuel injection quantity among the plurality of cylinders; and reduces a variation in the valve opening characteristics of the intake valve and the exhaust valve among the plurality of cylinders on the basis of the calculated exhaust gas air-fuel ratio of the cylinders.

In the control apparatus, the controller calculates the exhaust gas air-fuel ratio of each of the cylinders when the valve opening characteristics of the intake valve and the exhaust valve are set such that the amount of the intake air introduced into the cylinders is not limited by a throttle valve opening amount, but is limited by the valve opening characteristic of the intake valve and the exhaust valve after reducing the variation in the fuel injection quantity among the cylinders.

The control apparatus according to another aspect of the invention calculates, after reducing the variation in the fuel injection quantity among the cylinders, the exhaust gas air-fuel ratio of a cylinder in which the valve opening characteristics of the intake valve and the exhaust valve are set so as to limit the intake air amount introduced into the cylinder, and then reduces the variation in the valve opening characteristics of the intake valve and the exhaust valve among the cylinders based on the set exhaust gas air-fuel ratio. More preferably, the control apparatus calculates, after reducing the variation in the fuel injection quantity among the cylinders, the exhaust gas air-fuel ratio of the cylinder in which the valve opening characteristics of the intake valve and the exhaust valve are set such that the intake air amount introduced into the cylinder is limited by the valve opening characteristics of the intake valve or exhaust valve, and is not limited by the throttle valve opening amount, and then reduces the variation in the valve opening characteristics of the intake valve and the exhaust valve among the cylinders based on the calculated exhaust gas air-fuel ratio. That is, after reducing the variation in the fuel injection quantity among the cylinders, the control apparatus changes the valve opening characteristics of the intake valve and the exhaust valve of each cylinder so that the exhaust gas air-fuel ratio of one cylinder is made equivalent to that of another cylinder. The control apparatus is capable of reducing the variation in the valve opening characteristics of the intake valve and the exhaust valve among the cylinders without generating variation in the torque among the cylinders irrespective of the variation in the fuel injection quantity among the cylinders.

In the control apparatus, the controller calculates the exhaust gas air-fuel ratio of each of the cylinders when the operation angle of the intake valve is set to an operation angle that is smaller than the predetermined operation angle after reducing the variation in the fuel injection quantity among the cylinders, and reduces a variation in the amount of the intake air among the cylinders on the basis of the calculated exhaust gas air-fuel ratio of each of the cylinders.

The control apparatus of the invention calculates, after reducing the variation in the fuel injection quantity among the cylinders, the exhaust gas air-fuel ratio of each of the cylinders in which the operation angle of the intake valve is set to an operation angle smaller than the predetermined operation angle, and then reduces the variation in the intake air amount among the cylinders on the basis of the calculated exhaust gas air-fuel ratio. That is, after reducing the variation in the fuel injection quantity among the cylinders, the operation angle of the intake valve of each cylinder is changed such that the exhaust gas air-fuel ratio of one cylinder is made equivalent to that of another cylinder. The control apparatus is capable of reducing the variation in the intake air amount among the cylinders without generating variation in torque among the cylinders irrespective of the variation in the fuel injection quantity among the cylinders.

In the control apparatus, the controller calculates the exhaust gas air-fuel ratio of each of the cylinders when the operation angle of the intake valve is set to an operation angle that is smaller than the predetermined operation angle after reducing the variation in the fuel injection quantity among the cylinders, and reduces a variation in the operation angle of the intake valve among the cylinders on the basis of the calculated exhaust gas air-fuel ratio of each of the cylinders.

The control apparatus of the invention calculates, after reducing the variation in the fuel injection quantity among the cylinders, the exhaust gas air-fuel ratio of the cylinder in which the operation angle of the intake valve is set to an operation angle smaller than the predetermined operation angle, and then reduces the variation in the operation angle of the intake valve among the cylinders on the basis of the calculated exhaust gas air-fuel ratio. That is, after reducing the variation in the fuel injection quantity among the cylinders, the operation angle of the intake valve of each cylinder is changed such that the exhaust gas air-fuel ratio of one cylinder is made equivalent to that of another cylinder. The control apparatus is capable of reducing the variation in the intake air amount among the cylinders without generating a variation in torque among the cylinders irrespective of the variation in the fuel injection quantity among the cylinders.

In the control apparatus, a neural network can be used to reduce the variation among the cylinders.

The control apparatus of the invention preferably reduces the variation among the cylinders using a neural network. As a result, the variation among the cylinders can be reduced more effectively than a general-purpose control apparatus in which the neural network is not employed.

According to another aspect of the invention, the control apparatus for a multi-cylinder internal combustion engine including a plurality of cylinders is provided with a controller that reduces a variation among the cylinders on the basis of a valve overlap amount of an intake valve and an exhaust valve of each of the cylinders.

In the control apparatus, the controller reduces a variation in a fuel injection quantity among the cylinders on the basis of the valve overlap amount of the intake valve and the exhaust valve of each of the cylinders.

The control apparatus of this aspect of the invention reduces the variation among the cylinders on the basis of a valve overlap amount of the intake valve and the exhaust valve. More specifically, the control apparatus reduces the variation in the fuel injection quantity among the cylinders on the basis of the valve overlap amount of the intake valve and the exhaust valve. The control apparatus of the invention is capable of reducing the variation in the air-fuel ratio among the cylinders more effectively when the valve overlap amount can be changed than the control apparatus for a multi-cylinder internal combustion engine disclosed in Japanese Patent Application Laid-Open Publication No. 6-213044, in which the variation among the cylinders cannot be reduced on the basis of the valve overlap amount of the intake valve and the exhaust valve. In other words, the control apparatus is capable of appropriately controlling the variation in the air-fuel ratio among the cylinders.

According to another aspect of the invention, a control apparatus for a multi-cylinder internal combustion engine including a plurality of cylinders is provided with a controller that reduces a variation among the cylinders on the basis of an operation angle of an intake valve of each of the cylinders.

In the control apparatus, the controller reduces a variation in an air-fuel ratio among the cylinders on the basis of the operation angle of the intake valve of each of the cylinders.

The control apparatus of this aspect of the invention reduces a variation among the cylinders on the basis of an operation angle of the intake valve. More specifically, the control apparatus reduces the variation in the air-fuel ratio among the cylinders on the basis of the operation angle of the intake valve. Unlike the control apparatus for a multi-cylinder internal combustion engine disclosed in Japanese Patent Application Laid-Open Publication No. 6-213044, in which a variation between cylinders cannot be reduced on the basis of the operation angle of the intake valve, the control apparatus of the invention is capable of reducing the variation in the air-fuel ratio among the cylinders appropriately even when the operation angle of the intake valve is changed. The variation in the air-fuel ratio among the cylinders, thus, can be appropriately controlled.

In the control apparatus, the controller reduces a variation in the air-fuel ratio among the cylinders by correcting a fuel injection quantity on the basis of the operation angle of the intake valve.

In the control apparatus, an amount of correction of the fuel injection quantity is increased as the operation angle of the intake valve is decreased.

In the control apparatus according to another aspect of the invention, the controller calculates a fuel injection quantity correction coefficient for reducing the variation in the air-fuel ratio when the variation in the air-fuel ratio among the cylinders is detected, calculates a relationship between the calculated fuel injection quantity correction coefficient and the operation angle of the intake valve obtained upon calculation of the fuel injection quantity correction coefficient, and updates the fuel injection quantity correction coefficient when the operation angle of the intake valve is changed on the basis of the changed operation angle and the calculated relationship.

In the control apparatus, the fuel injection quantity correction coefficient changes relative to the operation angle of the intake valve such that an amount of correction of the fuel injection quantity is increased as the operation angle is decreased.

The control apparatus as described above reduces the variation in the air-fuel ratio among the cylinders by correcting the fuel injection quantity on the basis of the operation angle of the intake valve. For example, when the air-fuel ratio of one cylinder varies on the rich side, the fuel injection quantity supplied to the cylinder is decreased so as to reduce the variation in the air-fuel ratio among the cylinders. Also, the smaller the operation angle of the intake valve becomes, the greater the variation in the air-fuel ratio becomes among the cylinders when the actual operation angle deviates from the target operation angle. In view of this, the variation in the air-fuel ratio among the cylinders can be reduced by executing correction, for example, increasing the fuel injection quantity as the operation angle of the intake valve becomes smaller. This allows the variation in the air-fuel ratio among the cylinders to be controlled more appropriately than when the fuel injection quantity is not corrected on the basis of the operation angle of the intake valve. More specifically, when a variation in the air-fuel ratio among the cylinders is detected, the control apparatus calculates a fuel injection quantity correction coefficient for reducing such variation, and also calculates a relationship between the calculated fuel injection quantity correction coefficient and the operation angle of the intake valve upon calculation of the fuel injection quantity correction coefficient. When the operation angle of the intake valve has changed, the control apparatus then updates the fuel injection quantity correction coefficient on the basis of the changed operation angle of the intake valve and the calculated relationship. The relationship between the fuel injection quantity correction coefficient and the operation angle of the intake valve can be represented by a relation formula or a map, for example.

According to another aspect of the invention, a control apparatus for a multi-cylinder internal combustion engine including a plurality of cylinders is provided with a controller that corrects a coefficient for an air-fuel ratio feedback control to a predetermined coefficient on the basis of an operation angle of an intake valve of each of the cylinders, wherein a number of sensors provided in the internal combustion engine for detecting an air-fuel ratio or an oxygen concentration is smaller than a number of the cylinders of the internal combustion engine.

In the control apparatus, the coefficient for the air-fuel ratio feedback control is corrected to the predetermined coefficient such that a target air-fuel ratio is increased as the operation angle of the intake valve is decreased.

According to another aspect of the invention, a control apparatus for a multi-cylinder internal combustion engine including a plurality of cylinders is provided with a controller that corrects a target air-fuel ratio on the basis of an operation angle of an intake valve of each of the cylinders, wherein a number of sensors provided in the internal combustion engine for detecting an air-fuel ratio or an oxygen concentration is smaller than a number of each of the cylinders of the internal combustion engine.

In the control apparatus, the target air-fuel ratio is corrected such that an amount for correcting the target air-fuel ratio is increased as the operation angle of the intake valve is decreased.

According to another aspect of the invention, the controller calculates the target air-fuel ratio when a variation in the air-fuel ratio among the cylinders is detected, calculates a relationship between the target air-fuel ratio and the operation angle of the intake valve on the basis of the calculated target air-fuel ratio and the operation angle of the intake valve obtained upon detection of the variation in the air-fuel ratio; and updates the target air-fuel ratio when the operation angle of the intake valve is changed on the basis of the changed operation angle of the intake valve and the calculated relationship between the target air-fuel ratio and the operation angle of the intake valve of the cylinder.

The control apparatus of the invention corrects a predetermined coefficient relating to an air-fuel ratio feedback control on the basis of the operation angle of the intake valve. More specifically, the control apparatus corrects the target air-fuel ratio on the basis of the operation angle of the intake valve. For example, in the event that the overall air-fuel ratio shifts over to the rich side as a result of the target air-fuel ratio not being set appropriately due to the fact that the sensor is not sufficiently exposed to the gas, the control apparatus then corrects the target air-fuel ratio so as to shift the overall air-fuel ratio toward the lean side. Also, when the actual operation angle of the intake valve deviates from the target operation angle, the target air-fuel ratio that is set on the basis of a value output by the sensor is likely to largely deviate from the appropriate target air-fuel ratio as the operation angle of the intake valve becomes smaller. In view of this fact, for example, the correction amount for the target air-fuel ratio is increased as the operation angle of the intake valve becomes smaller. This allows the value of the target air-fuel ratio to be made more appropriate than when the target air-fuel ratio is not corrected on the basis of the operation angle of the intake valve. That is, the control apparatus is capable of executing appropriate air-fuel ratio feedback control even when a sensor is not sufficiently exposed to the exhaust gas, i.e., even when a target air-fuel ratio calculated from a value output by a sensor is not an appropriate target air-fuel ratio. More specifically, when a variation in the air-fuel ratio among the cylinders is detected, the control apparatus calculates a target air-fuel ratio (corrects it to an appropriate target air-fuel ratio), and also calculates a relationship between that target air-fuel ratio and the operation angle of the intake valve obtained at that time. When the operation angle of the intake valve changes, the control apparatus then calculates the appropriate target air-fuel ratio on the basis of the changed operation angle of the intake valve and the calculated relationship. The relationship between the target air-fuel ratio and the operation angle of the intake valve can be represented by a relational expression or a map, for example.

In the control apparatus, the controller reduces a variation in the air-fuel ratio among the cylinders by correcting a fuel injection quantity of each of the cylinders independently when an amount of correction of the calculated fuel injection quantity is smaller than a predetermined value, and guards the amount for correcting the calculated fuel injection quantity, corrects the target air-fuel ratio, and uniformly corrects each of the fuel injection quantity of all the cylinders on the basis of the corrected target air-fuel ratio when an amount of correction of the calculated fuel injection quantity is larger than the predetermined value.

In view of the possibility that a large correction amount for the fuel injection quantity might result in a variation in torque, the control apparatus of the invention minimizes the variation in the air-fuel ratio between cylinders by individually correcting the fuel injection quantity in each of the cylinders when a calculated correction amount for the fuel injection quantity is small, and guards the calculated correction amount for the fuel injection quantity with a predetermined value when the correction amount for the fuel injection quantity is large. At the same time, the control apparatus also corrects the target air-fuel ratio and then uniformly corrects the fuel injection quantity of all of the cylinders on the basis of that target air-fuel ratio. Accordingly the air-fuel ratio can be appropriately controlled while minimizing the variation in torque.

BRIEF DESCRIPTION OF THE DRAWINGS

The invention will be described in conjunction with the following drawings, in which like reference numerals refer to similar elements, and wherein.

DETAILED DESCRIPTION OF PREFERRED EMBODIMENTS

Hereinafter embodiments of the invention will be described with reference to the attached drawings.

Figure 1:
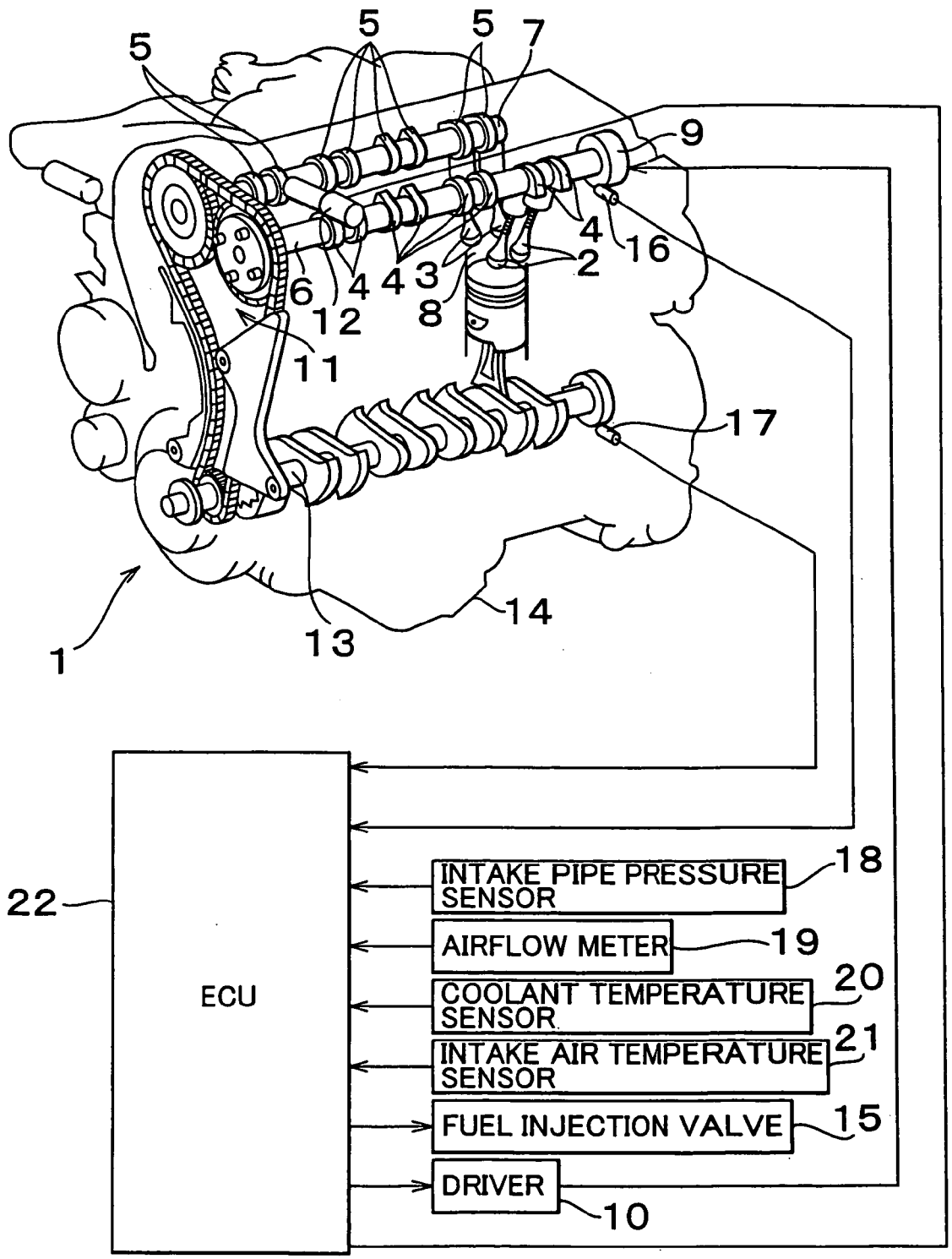
FIG. 1 is a schematic block diagram of a control apparatus for an internal combustion engine according to an embodiment of the invention.
Figure 2:
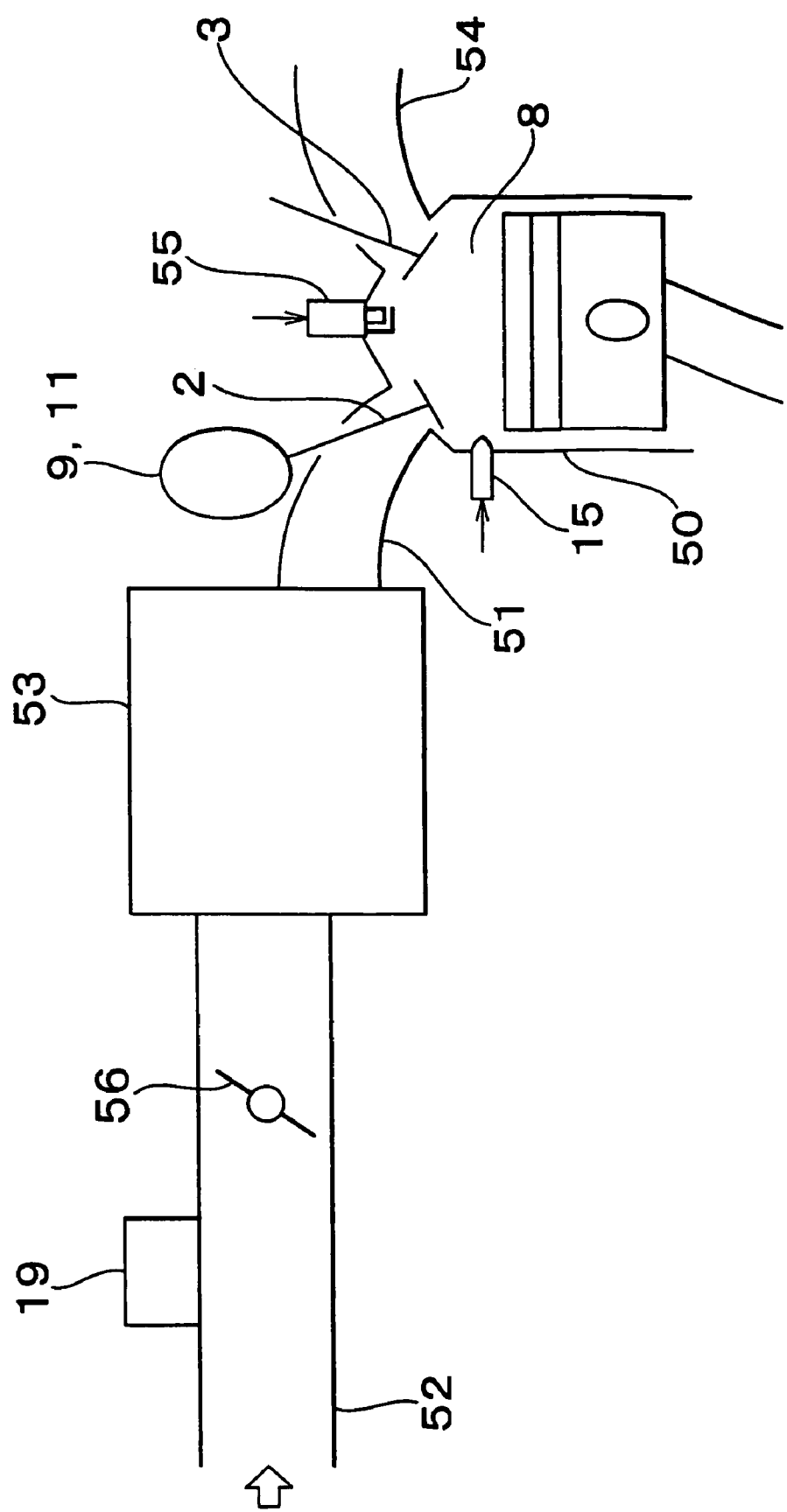
FIG. 2 is a detailed view of an intake system and the like of the control apparatus for an internal combustion engine shown in FIG. 1.
Figure 3:
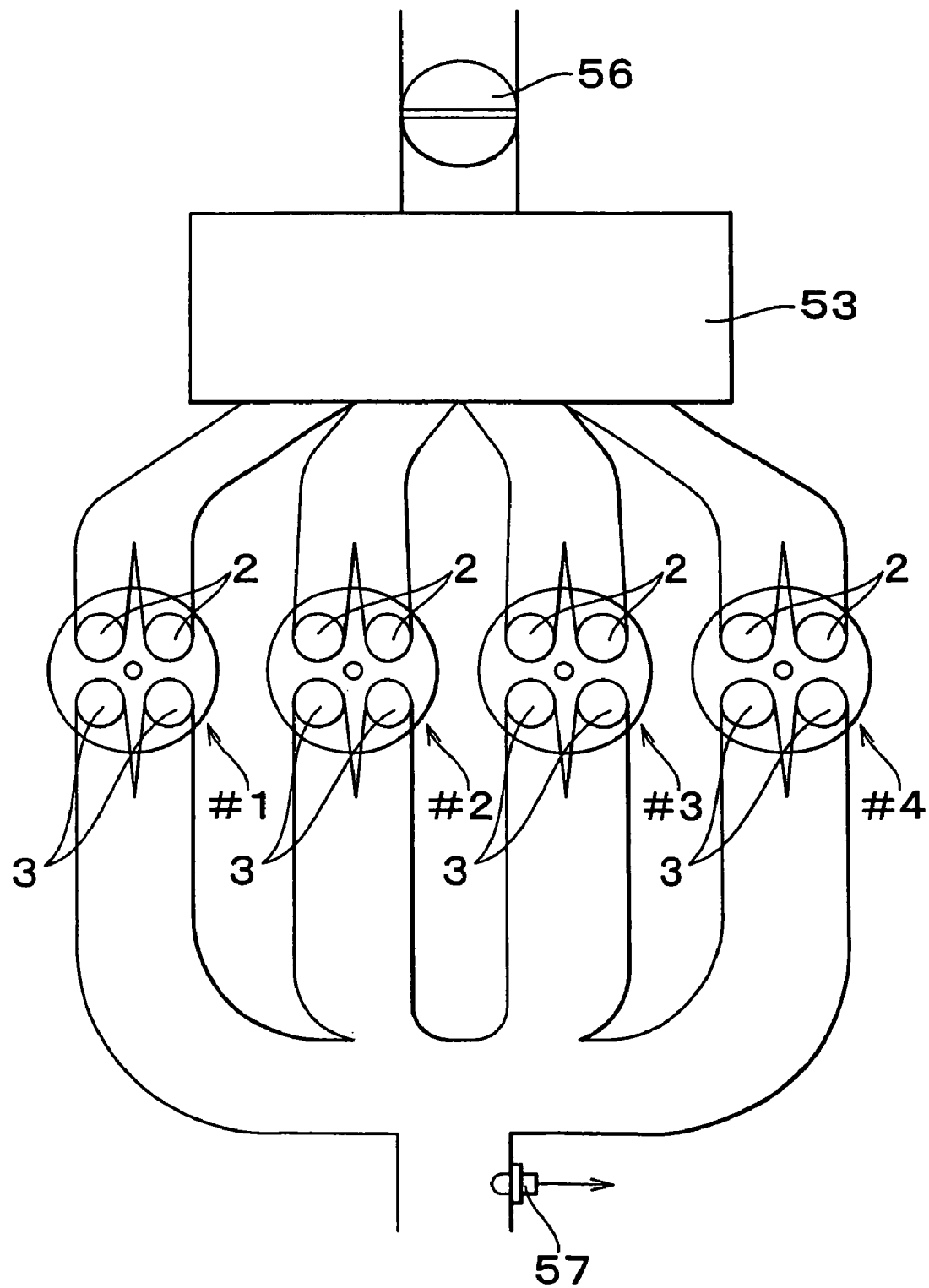
FIG. 3 is a plan view of an intake system and the like of the control apparatus for an internal combustion engine shown in FIG. 2.
Figure 4:
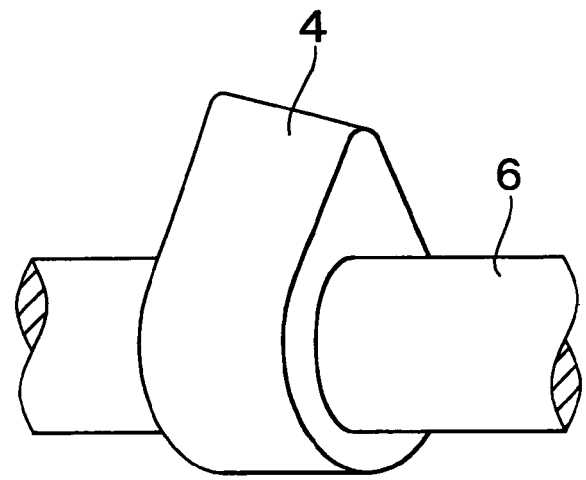
FIG. 4 is a detailed view of a cam and cam shaft for the intake valve shown in FIG. 1.

FIGS. 1 through 3, which illustrate an embodiment of the invention for controlling a first type of an internal combustion engine 1, show an intake valve 2, an exhaust valve 3, a cam 4 for opening and closing the intake valve 2, a cam 5 for opening and closing the exhaust valve 3, a cam shaft 6 which supports the cam 4, and a cam shaft 7 which supports the cam 5. As shown in FIG. 4, the cam profile of the cam 4 according to this exemplary embodiment is modified in the direction along the central axis of the cam shaft, i.e., the left end of the nose of the first cam 4 in the figure is higher than the right end thereof. This feature may be utilized to change the valve lift amount of the intake valve 2 depending on the contact between the valve lifter and one end of the cam 4. That is, when the valve lifter contacts the right end of the cam 4, the valve lift amount will become smaller than the valve lift amount obtained when the valve lifter contacts the left end of the cam 4.

FIGS. 1 through 3 also show a combustion chamber 8 formed in a cylinder and a valve lift amount changing device 9 for shifting the cam 4 in the direction along the central axis of the cam shaft with respect to the intake valve 2 to change the valve lift amount. That is, operating the valve lift amount changing device 9 brings the left or right end (in FIG. 4) of the cam 4 into contact with the valve lifter selectively. Changing the valve lift amount of the intake valve 2 by the valve lift amount changing device 9 consequentially changes the open area of the intake valve 2. The intake valve 2 according to this exemplary embodiment is structured such that the open area of the intake valve 2 increases as the valve lift amount increases. FIGS. 1 through 3 also show a driver 10 for driving the valve lift amount changing device 9 and an opening/closing timing shift device 11 for shifting the opening/closing timing of the intake valve 2 regardless of a change in the open period thereof. That is, operation of the opening/closing timing shift device 11 enables the opening/closing timing of the intake valve 2 to be shifted to the advance side or the retard side. The figures also show an oil control valve 12 for controlling an oil pressure for operating the opening/closing timing shift device 11. Both the valve lift amount changing device 9 and the opening/closing timing shift device 11 are included in the variable valve train in this exemplary embodiment.

FIGS. 1 through 3 also show a crank shaft 13, an oil pan 14, a fuel injection valve 15, a first sensor 16 for detecting both a valve lift amount and an opening/closing timing shift amount of the intake valve 2, a second sensor 17 for detecting an engine speed, an intake pipe pressure sensor 18 for detecting a pressure within an intake pipe that supplies intake air to the cylinder, an airflow meter 19, a coolant temperature sensor 20 for detecting a temperature of a coolant in the internal combustion engine 1, an intake air temperature sensor 21 for detecting a temperature within the intake pipe for intake air to be supplied to the cylinder, an ECU (electronic control unit) 22, a cylinder 50, intake pipes 51 and 52, a surge tank 53, an exhaust pipe 54, a spark plug 55, a throttle valve 56, the opening amount of which changes regardless of the accelerator pedal operation amount, and an air-fuel ratio sensor 57 for detecting an exhaust gas air-fuel ratio.

Figure 5:
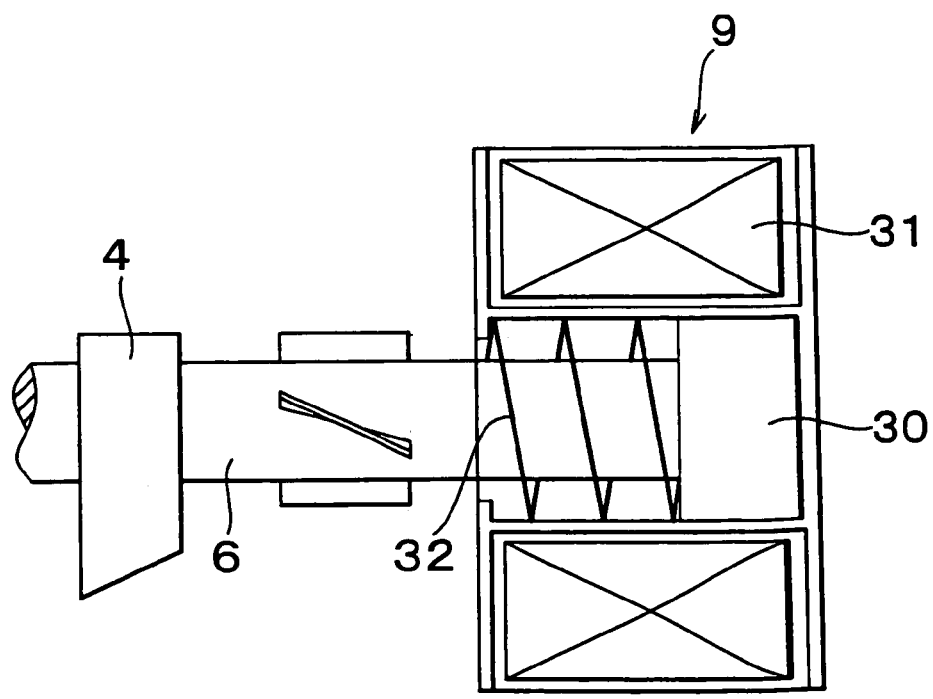
FIG. 5 is a detailed view of the apparatus and the like for changing a valve lift amount.

FIG. 5 shows a magnetic body 30 connected to the cam shaft 6, a coil 31 for urging the magnetic body 30 to the left, and a compression spring 32 for urging the magnetic body 30 to the right. As the amount of current passing through the coil 31 increases, the amount by which the cam 4 and the cam shaft 6 shift to the left increases and the valve lift amount of the intake valve 2 decreases.

Figure 6:
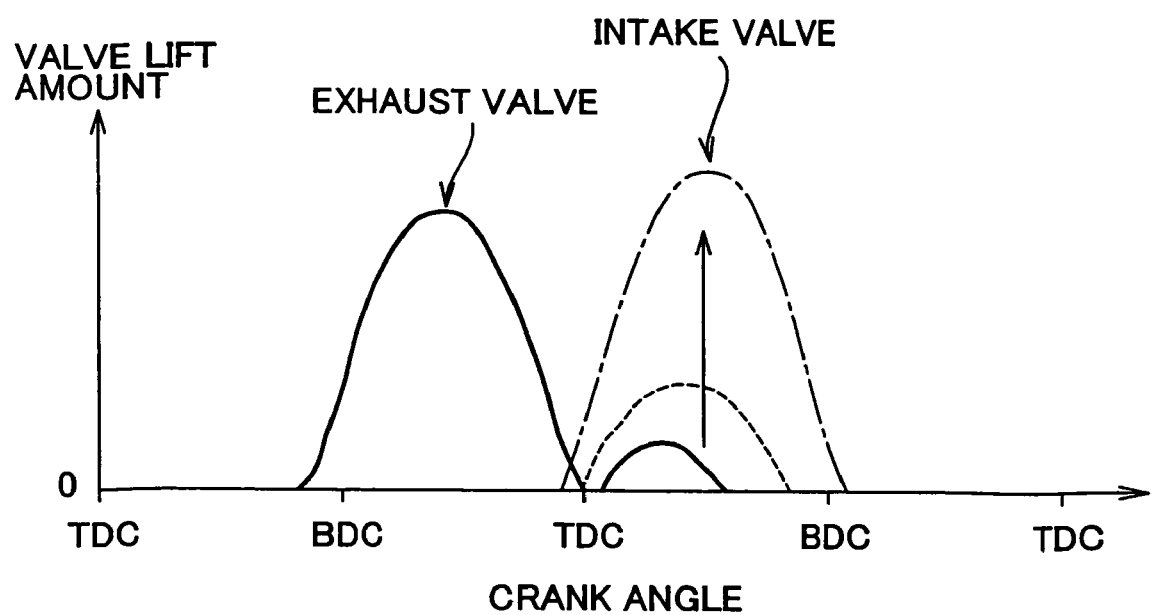
FIG. 6 is a graph showing the change in the valve lift amount of the intake valve following operation of an apparatus for changing the valve lift amount.

As shown in FIG. 6, the valve lift amount of the intake valve 2 increases as the amount of current passing through the coil 31 decreases (solid line→broken line→chain line). Further in this exemplary embodiment, the closed period of the intake valve 2 also changes as the valve lift amount changing device 9 is operated. That is, the operation angle of the intake valve 2 also changes. More specifically, the operation angle of the intake valve 2 increases as the valve lift amount of the intake valve 2 increases (solid line→broken line→chain line). Moreover in this embodiment, the timing at which the valve lift amount of the intake valve 2 is at its peak also changes as the valve lift amount changing device 9 is operated. More specifically, the timing at which the valve lift amount of the intake valve 2 is at its peak is retarded as the valve lift amount of the intake valve 2 increases (solid line→broken line→chain line).

Figure 7:
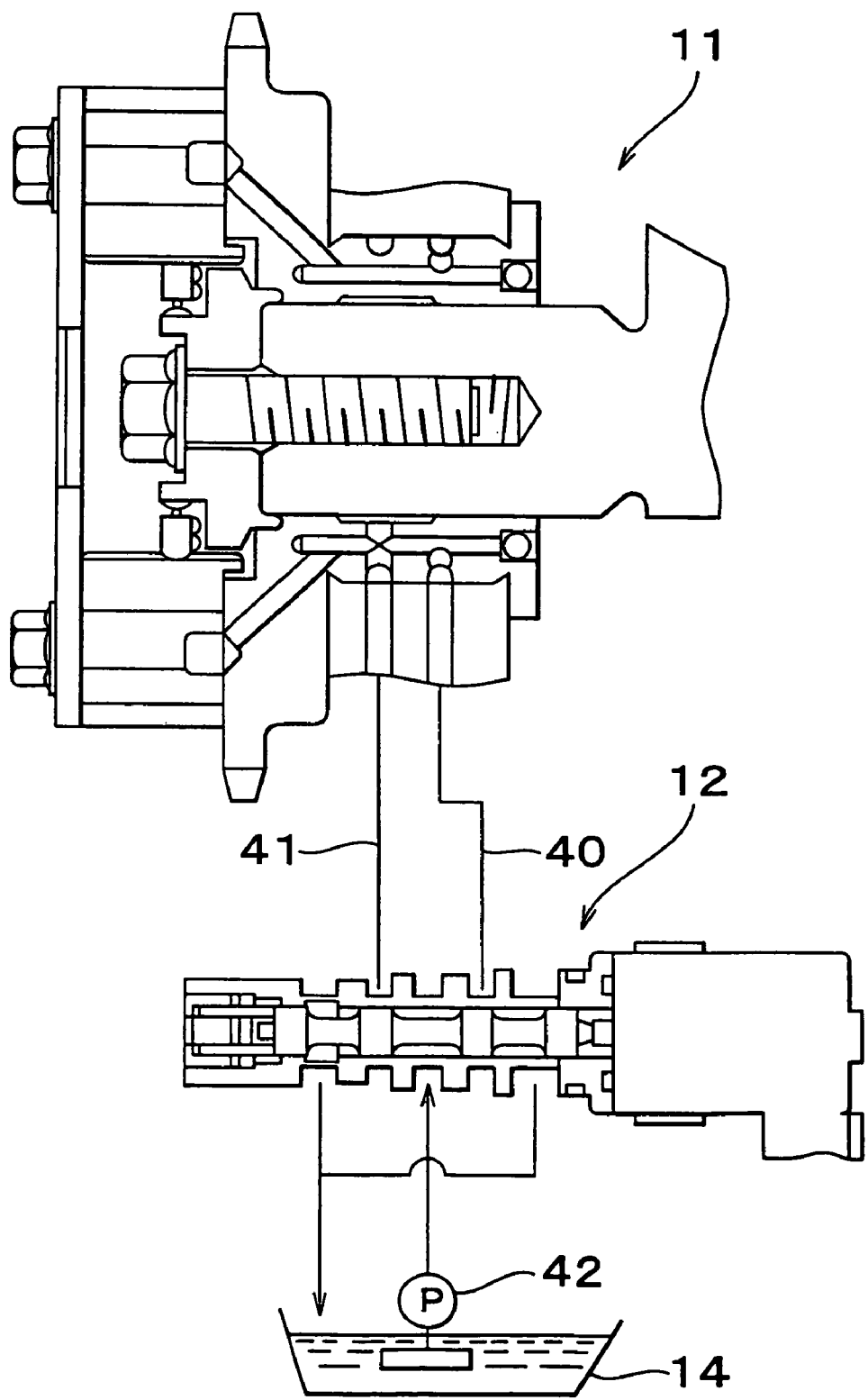
FIG. 7 is a detailed view of the apparatus and the like for shifting an opening and closing timing of the intake valve shown in FIG. 1.

FIG. 7 shows an advance side oil passage 40 for shifting the opening/closing timing of the intake valve 2 to the advance side, a retard side oil passage 41 for shifting the opening/closing timing of the intake valve 2 to the retard side, and an oil pump 42. The opening/closing timing of the intake valve 2 shifts to the advance side as the oil pressure within the advance side oil passage 40 increases. That is, the rotation phase of the cam shaft 6 is advanced with respect to the crank shaft 13. Conversely, the opening/closing timing of the intake valve 2 shifts to the retard side as the oil pressure within the retard side oil passage 41 increases. That is, the rotation phase of the cam shaft 6 is retarded with respect to the crank shaft 13.

Figure 8:
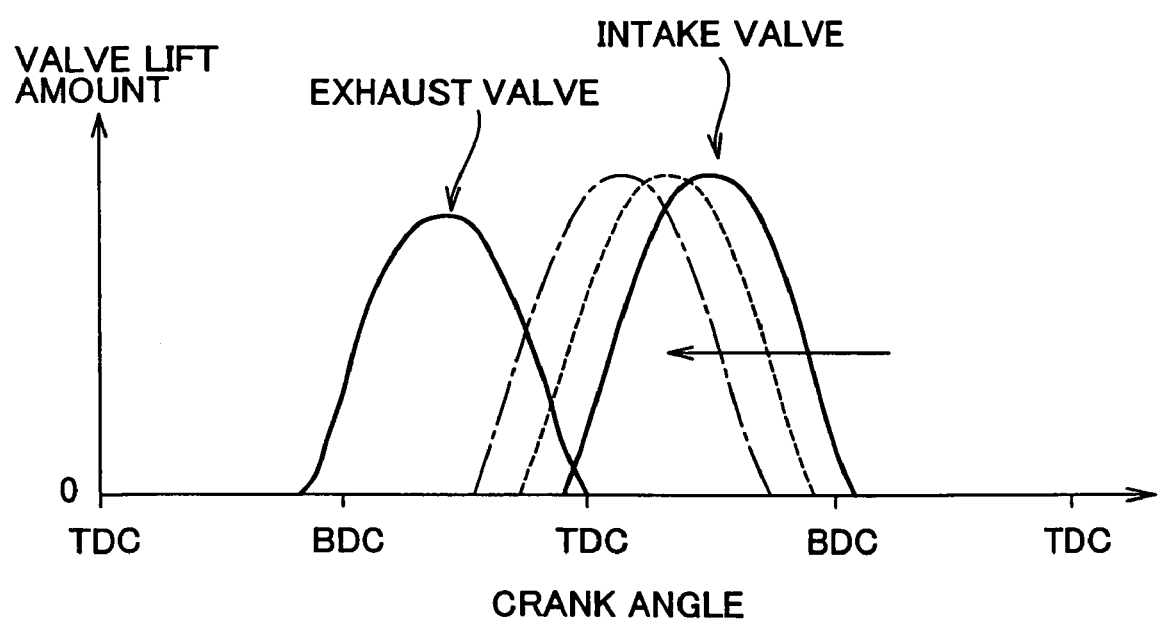
FIG. 8 is a graph showing the shift in the opening and closing timing of the intake valve following operation of the apparatus for shifting the opening and closing timing of the intake valve.

As shown in FIG. 8, the opening/closing timing of the intake valve 2 shifts to the advance side as the oil pressure within the advance side oil passage 40 increases (solid line→broken line→chain line). At this time, the open period of the intake valve 2 does not change, i.e., the length of the period during which the intake valve 2 is open does not change.

Figure 9:
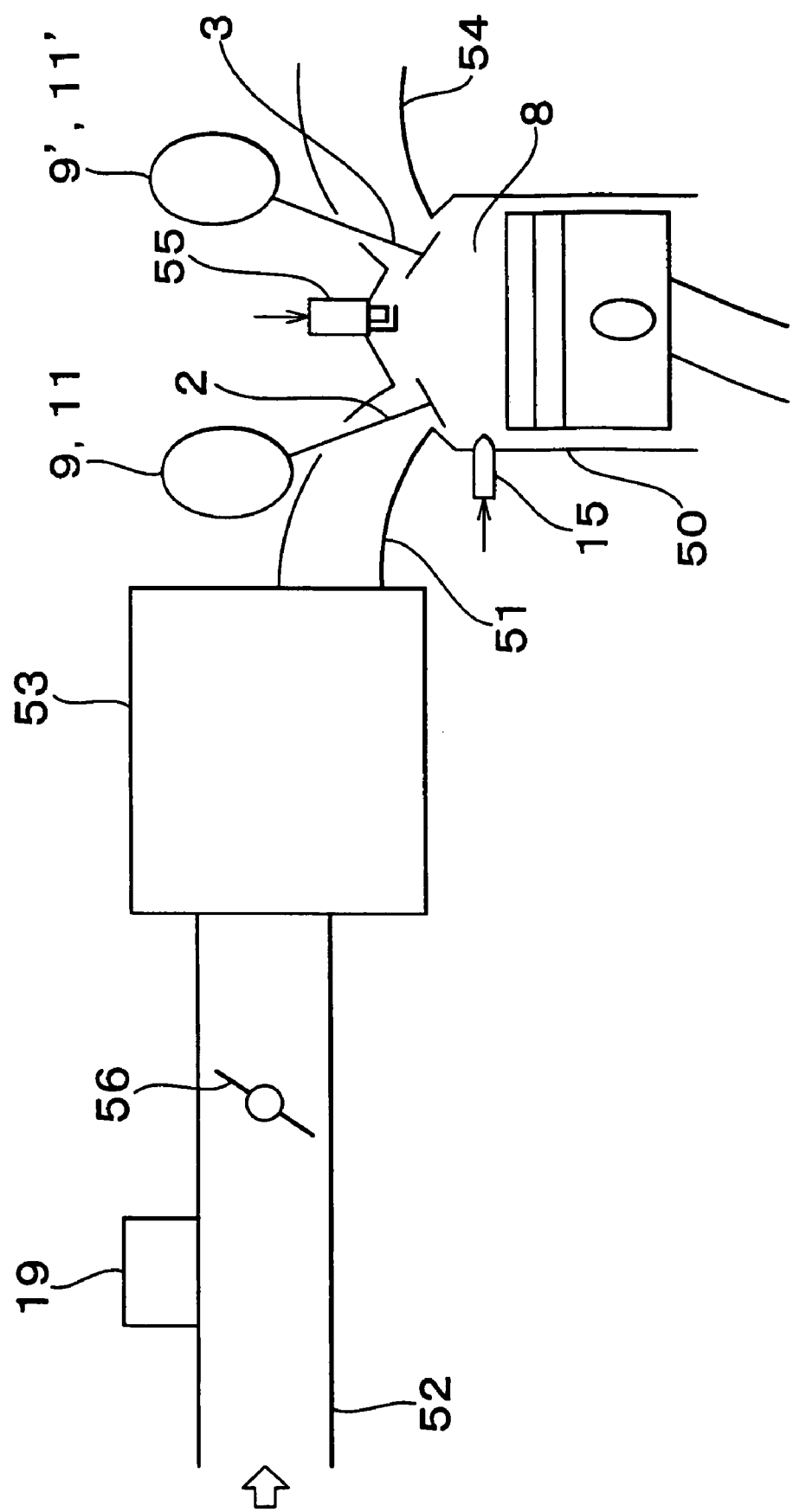
FIG. 9 is a detailed view of an intake system and the like of the control apparatus for another type of internal combustion engine according to an embodiment of the invention.

In FIG. 9, reference numerals that are the same as those in FIGS. 1 through 8 represent the same or like parts as those shown in FIGS. 1 through 8. In this embodiment for controlling a second type of internal combustion engine, the cam for driving the exhaust valve has generally the same configuration as the cam 4 shown in FIG. 4. FIG. 9 also shows a valve lift amount changing device 9' for shifting the cam for driving the exhaust valve in the direction along the central axis of the cam shaft with respect to the exhaust valve 3 to change the valve lift amount of the exhaust valve 3. This valve lift amount changing device 9' has generally the same configuration as the valve lift amount changing device 9. FIG. 9 also shows an opening/closing timing shift device 11' for shifting the opening/closing timing of the exhaust valve 3 regardless of the open period of the exhaust valve 3. This opening/closing timing shift device 11' has generally the same configuration as the opening/closing timing shift device 11.

Figure 10:
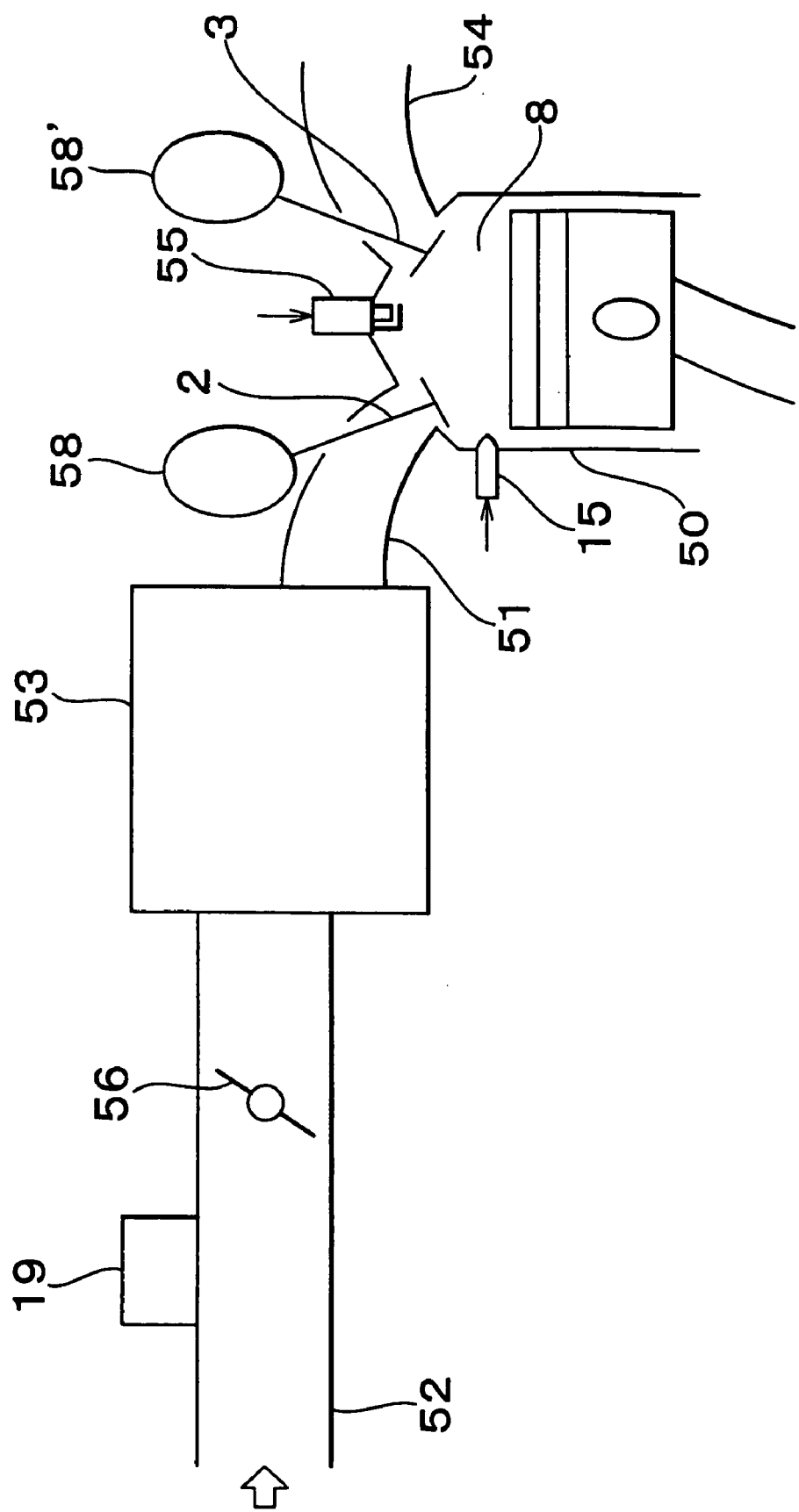
FIG. 10 is a detailed view of an intake system and the like of the control apparatus for an internal combustion engine according to a third embodiment.

In FIG. 10, which illustrates an embodiment for controlling a third type of internal combustion engine 2, reference numerals that are the same as those in FIGS. 1 through 8 represent the same or like parts as those shown in FIGS. 1 through 8. FIG. 10 also shows an intake valve driving device 58 which is capable of driving individual intake valves 2 (refer to FIG. 3) independently, e.g., an electromagnetic driving type intake valve driving device, and an exhaust valve driving device 58' which is capable of driving individual exhaust valves 3 (refer to FIG. 3) independently, e.g., an electromagnetic driving type exhaust valve driving device.

In modifications of the foregoing exemplary embodiments, the throttle valve 56 may be eliminated.

In the foregoing exemplary embodiments and modifications thereof, when the air-fuel ratio of a cylinder among a plurality of cylinders Nos. 1 through 4, is calculated based on a value output from the air-fuel ratio sensor 57 and the valve lift amount of the intake valve 2 and/or exhaust valve 3 of each cylinder is controlled, a variation in the air-fuel ratio between cylinders is able to be reduced. If variation in the fuel injection quantity exists between cylinders, however, even if the variation in the air-fuel ratio between cylinders is reduced, a variation in torque between cylinders is generated, resulting in a pulsation (torque variation). Therefore, according to the first and second exemplary embodiments and modifications thereof, control such as that to be described later is performed to both reduce variation in the air-fuel ratio between cylinders and reduce variation in the torque between cylinders.

Figure 11:
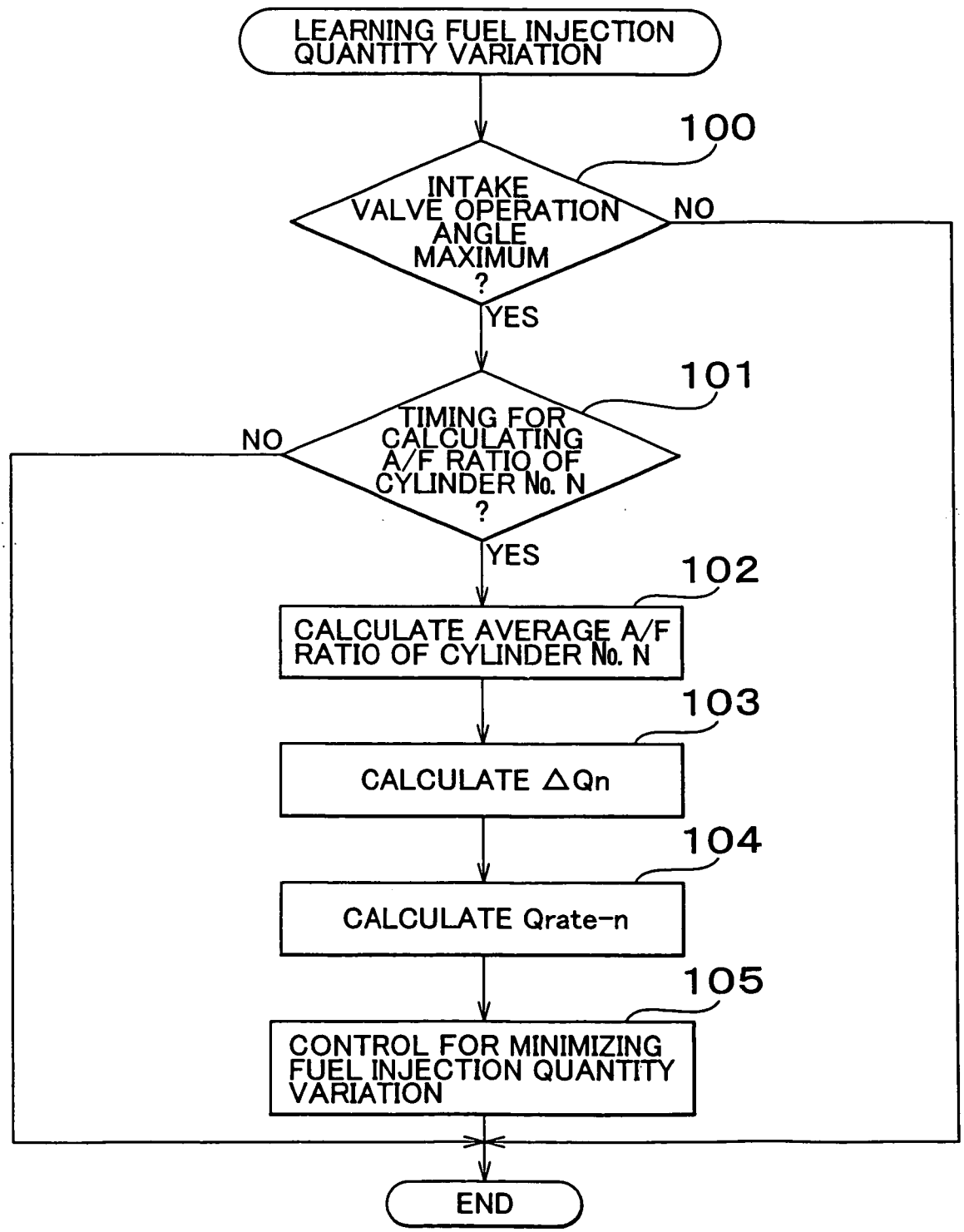
FIG. 11 is a flow chart showing a method for learning fuel injection quantity variation according to the first and second embodiments, as well as modifications thereof.

A routine according to a method for learning fuel injection quantity variation according to the foregoing embodiments and modification thereof as shown in FIG. 11 is performed at predetermined intervals. As shown in the figure, when this routine starts, it is determined in Step 100 whether the operation angle of the intake valve 2 is at its maximum, as illustrated by the chain line in FIG. 6, for example. When the above determination is "NO", i.e., when the operation angle of the intake valve 2 is relatively small, such that the open area of the intake valve 2 is relatively small, the intake air amount to be introduced into the cylinder 50 is determined based on the open area of the intake valve 2. In the event that variation in the operation angle of the intake valve 2 among cylinders exists temporarily, the intake air amount varies among cylinders and it is determined that learning variation in the fuel injection quantity is not possible and the routine ends. Meanwhile, when the determination in Step 100 is "YES", then the intake air amount to be introduced into the cylinder 50 is determined based on the opening amount of the throttle valve 56 or the cross-sectional area of the portion of the intake pipes 51 and 52 having the smallest internal circumference. Even if variation in the operation angle of the intake valve 2 exists among cylinders, it is determined that the intake air amount does not vary among cylinders, and the process proceeds to Step 101.

In Step 101, it is determined whether it is time to calculate the exhaust gas air-fuel ratio of the specified cylinder No. N among a plurality of cylinders Nos. 1 through 4. When the determination is "NO", the routine ends. When the determination is "YES", the process proceeds to Step 102. In Step 102, the exhaust gas air-fuel ratio of the cylinder No. N, for example, is detected for several cycles and the mean air-fuel ratio thereof is calculated. This mean air-fuel ratio calculation is performed for all of the cylinders Nos. 1 through 4. Next, in Step 103, the variation $\Delta Qn$ in the fuel injection quantity among the cylinders is calculated using the air-fuel ratio of each of the cylinders Nos. 1 through 4 calculated in Step 102 on the assumption that the intake air amounts to be introduced into each of the cylinders Nos. 1 through 4 are all the same.

Next in Step 104, a variation rate Qrate-n of the fuel injection quantity is calculated based on the variation $\Delta Qn$ in the fuel injection quantity between the cylinders calculated in Step 103. Then in Step 105, the fuel injection quantity of each of the cylinders Nos. 1 through 4 is corrected so as to eliminate or reduce the variation in the fuel injection quantity among the cylinders.

In the aforementioned case, when it is determined in Step 100 that the operation angle of the intake valve 2 is set to the maximum operation angle, the exhaust gas air-fuel ratio of that cylinder is then calculated in Step 102. That is, when it is determined in Step 100 that the operation angle of the intake valve 2 is set such that the intake air amount introduced into the cylinder is not limited by the operation angle of the intake valve 2, the exhaust gas air-fuel ratio of that cylinder is then calculated in Step 102. More specifically, when it is determined in Step 100 that the operation angle of the intake valve 2 is set such that the intake air amount introduced into the cylinder is limited by the opening amount of the throttle valve 56, and not limited by the operation angle of the intake valve 2, the exhaust gas air-fuel ratio of that cylinder is calculated in Step 102. In other words, for the exhaust gas air-fuel ratio of a cylinder to be calculated in Step 102, the operation angle of the intake valve 2 is set, in a step which is not shown, such that the intake air amount introduced into that cylinder is limited by the opening amount of the throttle valve 56, and is not limited by the operation angle of the intake valve 2. That is, by making the opening amount of the throttle valve 56 when the exhaust gas air-fuel ratio of the first cylinder No. 1 is calculated and the opening amount of the throttle valve 56 when the exhaust gas air-fuel ratios of the other cylinders Nos. 2 through 4 are calculated substantially the same, it is possible to make the intake air amount to be introduced into the first cylinder No. 1 when the exhaust gas air-fuel ratio thereof is calculated and the intake air amount introduced into the other cylinders Nos. 2 through 4 when the exhaust gas air-fuel ratios thereof are calculated the same.

Further, according to the foregoing embodiments, when it is determined in Step 100 that the intake air amount to be introduced into the cylinder No. 1 upon calculation of the exhaust gas air-fuel ratio is the same as that to be introduced into the other cylinders Nos. 2 through 4 upon calculation of the exhaust gas air-fuel ratios, variation in the fuel injection quantity among the cylinders is minimized in Step 105 by the exhaust gas air-fuel ratio. That is, after making the intake air amount in all of the cylinders the same, the fuel injection quantity is corrected such that the exhaust gas air-fuel ratios in all of the cylinders are the same. This makes it possible to reduce both the variation in the air-fuel ratio among cylinders and the variation in the torque among cylinders.

In other words, according to the embodiments, when it is determined in Step 100 that the valve opening characteristics of the intake valve 2 are set such that the intake air amount to be introduced into the cylinder is limited by the opening amount of the throttle valve 56, and not limited by the valve opening characteristics of the intake valve 2, the exhaust gas air-fuel ratio of that cylinder is then calculated in Step 102. That is, for the exhaust gas air-fuel ratio of a cylinder to be calculated in Step 102, the valve opening characteristics of the intake valve 2 are set, in a step which is not shown, such that the intake air amount to be introduced into that cylinder is limited by the opening amount of the throttle valve 56, and is not limited by the valve opening characteristics of the intake valve 2.

Also according to modifications of the aforementioned embodiments in which the throttle valve 56 is not provided, when it is determined in Step 100 that the operation angle of the intake valve 2 is set to the maximum operation angle, the exhaust gas air-fuel ratio of that cylinder is calculated in Step 102. That is, when it is determined in Step 100 that the operation angle of the intake valve 2 is set so as not to limit the intake air amount to be introduced into the cylinder, the exhaust gas air-fuel ratio of that cylinder is then calculated in Step 102. More specifically, when it is determined in Step 100 that the operation angle of the intake valve 2 is set such that the intake air amount to be introduced into the cylinder is limited by the cross-sectional area of a portion of the intake pipes 51 and 52 having the smallest internal circumference, and is not limited by the operation angle of the intake valve 2, the exhaust gas air-fuel ratio of that cylinder is then calculated in Step 102. In other words, for the exhaust gas air-fuel ratio of a cylinder to be calculated in Step 102, the operation angle of the intake valve 2 is set, in a step (not shown) to the maximum operation angle such that the intake air amount to be introduced into the cylinder is limited by the cross-sectional area of a portion of the intake pipes 51 and 52 having the smallest internal circumference, and not limited by the operation angle of the intake valve 2.

In other words, according to the above-described modifications, when it is determined in Step 100 that the valve opening characteristics of the intake valve 2 are set such that the intake air amount to be introduced into the cylinder is limited by the cross-sectional area of a portion of the intake pipes 51 and 52 having the smallest internal circumference, and not limited by the valve opening characteristics of the intake valve 2, the exhaust gas air-fuel ratio of that cylinder is calculated in Step 102. That is, for the exhaust gas air-fuel ratio of a cylinder to be calculated in Step 102, the valve opening characteristics of the intake valve 2 are set, in a step (not shown) such that the intake air amount to be introduced into that cylinder is limited by the cross-sectional area of a portion of the intake pipes 51 and 52 having the smallest internal circumference, and is not limited by the valve opening characteristics of the intake valve 2.

Also according to the exemplary embodiments and modifications thereof, the variation among cylinders is able to be reduced based on the operation angle of the intake valve. More specifically, the variation in the fuel injection quantity among cylinders can be reduced by the operation angle of the intake valve. Even more specifically, when it is determined in Step 100 in FIG. 11 that the operation angle of the intake valve assumes a maximum value, the variation in the fuel injection quantity between the cylinders is minimized in Step 105. Therefore, when it is possible to change the operation angle of the intake valve, it is possible to control the variation in the air-fuel ratio between the cylinders more appropriately than when the variation between cylinders is not controlled by the operation angle of the intake valve. In other words, it is possible to appropriately control the variation in the air-fuel ratio among the cylinders.

Figure 12:
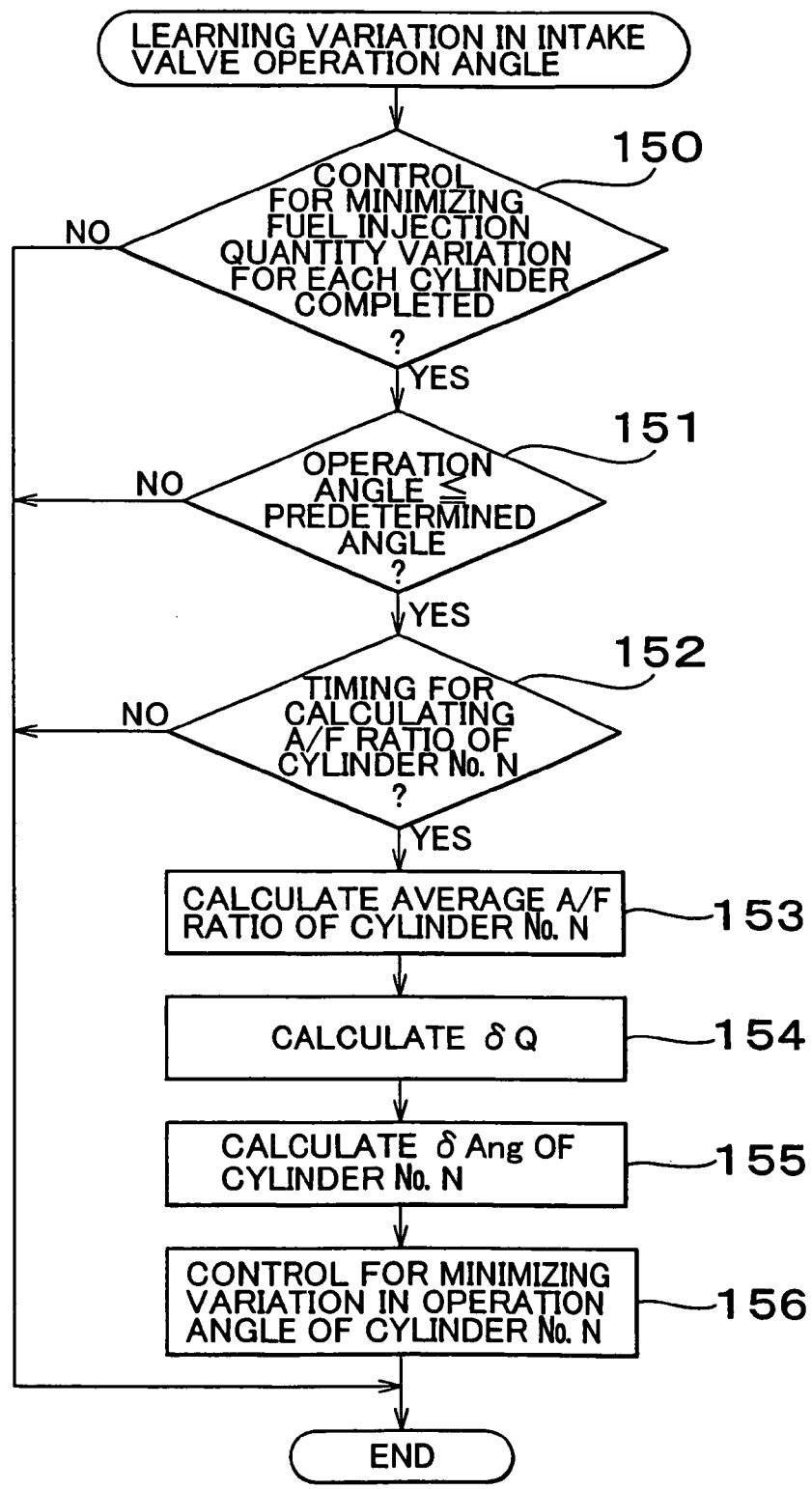
FIG. 12 is a flow chart showing a method for learning intake valve operation angle variation according to the second embodiment, as well as a modification thereof.

A routine according to the method for learning intake valve operation angle variation, according to the embodiment for controlling the third type of the internal combustion engine and a modification thereof shown in FIG. 12 is executed at predetermined intervals, just as the routine shown in FIG. 11. In FIG. 12, when this routine starts, it is first determined in Step 150 whether the correction control in Step 105 in FIG. 11 has been completed. If the correction of the fuel injection quantity for all of the cylinders is not yet complete, then it is determined that the variation in the operation angle of the intake valve 2 among the cylinders can not be reduced and the routine ends. If the correction of the fuel injection quantity for all of the cylinders is complete, then the process proceeds to Step 151. In Step 151, it is determined whether the operation angle of the intake valve 2 is equal to or less than a predetermined threshold value. That is, it is determined whether the operation angle of the intake valve 2 is set to a relatively small value such that the intake air amount to be introduced into the cylinder is limited by the operation angle of the intake valve 2, and not limited by the opening amount of the throttle valve 56. If the determination is "NO", the routine ends. If the determination is "YES", the process proceeds to Step 152.

In Step 152, it is determined whether it is time to calculate the exhaust gas air-fuel ratio of the specified cylinder, for example, cylinder No. N, among the plurality of cylinders Nos. 1 through 4. If the determination is "NO", the routine ends. If the determination is "YES", the process proceeds to Step 153. In Step 153, the exhaust gas air-fuel ratio of the cylinder No. N is detected for several cycles and the mean air-fuel ratio thereof is calculated. This mean air-fuel ratio calculation is performed for all of the cylinders Nos. 1 through 4. Next in Step 154, the variation $\Delta Q$ in the intake air amount among the cylinders is calculated using the air-fuel ratio of each of the cylinders Nos. 1 through 4 calculated in Step 153 on the assumption that the fuel injection quantity of each of the cylinders Nos. 1 through 4 is the same.

Next in Step 155, the variation $\Delta Ang$ in the operation angle of the intake valve 2 of a specified cylinder, for example, cylinder No. N, is calculated based on the variation $\Delta Q$ in the intake air amount among the cylinders calculated in Step 154. This calculation of the variation $\Delta Ang$ in the operation angle of the intake valve 2 is performed for all of the cylinders Nos. 1 through 4. Next in Step 156, the intake valve driving device 58 corrects the operation angle of the intake valve 2 of each of the cylinders Nos. 1 through 4 such that the variation in the operation angle of the intake valves 2 among the cylinders is reduced, i.e., such that the variation in the intake air amount among the cylinders is reduced.

According to the embodiment for controlling the third type of the internal combustion engine, after reducing the variation in the fuel injection quantity between the cylinders in Step 105 in FIG. 11, when it is determined in Step 151 that the valve opening characteristics of the intake valve 2 are set so that the intake air amount to be introduced into the cylinder is limited by the valve opening characteristics of the intake valve 2, and not limited by the opening amount of the throttle valve 56, the process proceeds to Step 153. In Step 153, the exhaust gas air-fuel ratio of that cylinder is calculated and then in Step 156 the variation in the valve opening characteristics of the intake valve 2 among cylinders is reduced by that exhaust gas air-fuel ratio. That is, after reducing the variation in the fuel injection quantity among the cylinders, the valve opening characteristics of the intake valve 2 of each of the cylinders Nos. 1 through 4 are changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among the cylinders, no variation in torque among cylinders is generated and variation in the valve opening characteristics of the intake valve 2 among the cylinders can be reduced.

Also, according to a modification of the embodiment, after reducing the variation in the fuel injection quantity among the cylinders in Step 105 in FIG. 11, when it is determined in Step 151 that the valve opening characteristics of the intake valve 2 are set so that the intake air amount to be introduced into the cylinder is limited by the valve opening characteristics of the intake valve 2, and not limited by the cross-sectional area of the portion of the intake pipes 51 and 52 having the smallest internal circumference, the process proceeds to Step 153. In Step 153, the exhaust gas air-fuel ratio of that cylinder is calculated and then in Step 156, the variation in the valve opening characteristics of the intake valve 2 among cylinders is reduced by that exhaust gas air-fuel ratio. That is, after reducing the variation in the fuel injection quantity among the cylinders, the valve opening characteristics of the intake valve 2 of each of the cylinders Nos. 1 through 4 are changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among cylinders, no variation in torque among cylinders is generated and the variation in the valve opening characteristics of the intake valves 2 among the cylinders can be reduced.

More specifically, according to the embodiment for controlling the third type of the internal combustion engine and the modification thereof, after reducing the variation in the fuel injection quantity among the cylinders in Step 105 in FIG. 11, when it is determined in Step 151 that the operation angle of the intake valve 2 is set to a predetermined angle which is smaller than the maximum operation angle, the process proceeds to Step 153. In Step 153, the exhaust gas air-fuel ratio is calculated and then in Step 156, the variation in the operation angle of the intake valve 2 among the cylinders is reduced by that exhaust gas air-fuel ratio. That is, after reducing the variation in the fuel injection quantity among the cylinders, the operation angle of the intake valve 2 of each of the cylinders Nos. 1 through 4 is changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among cylinders, no variation in torque among cylinders is generated and the variation in the operation angle of the intake valve 2 among the cylinders can be reduced.

According to the foregoing embodiment and the modification thereof, after reducing the variation in the fuel injection quantity among the cylinders in Step 105 in FIG. 11, when it is determined in Step 151 that the operation angle of the intake valve 2 is set to a predetermined operation angle that is smaller than the maximum operation angle, the process proceeds to Step 153. In Step 153, the exhaust gas air-fuel ratio is calculated and then in Step 156, the variation in the intake air amount among cylinders is reduced by that exhaust gas air-fuel ratio. That is, after reducing the variation in the fuel injection quantity among the cylinders, the operation angle of the intake valve 2 of each of the cylinders Nos. 1 through 4 is changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among the cylinders, no variation in torque among cylinders is generated and the variation in the intake air amount among the cylinders can be reduced.

Also according to the embodiments for controlling the first to the third type of the internal combustion engines and modifications thereof, a variation among cylinders is reduced by the operation angle of the intake valve. More specifically, when it is determined in Step 151 in FIG. 12 that the operation angle of the intake valve 2 is equal to or less than a predetermined threshold value, the variation in the operation angle of the intake valve 2 among the cylinders is reduced in Step 156. Therefore, when it is possible to change the operation angle of the intake valve, the variation in the air-fuel ratio among the cylinders can be controlled more appropriately than when the variation in the operation angle of the intake valve 2 among the cylinders is controlled irrespective of the aforementioned threshold value. In other words, it is possible to appropriately control the variation in the air-fuel ratio among the cylinders.

Figure 13:
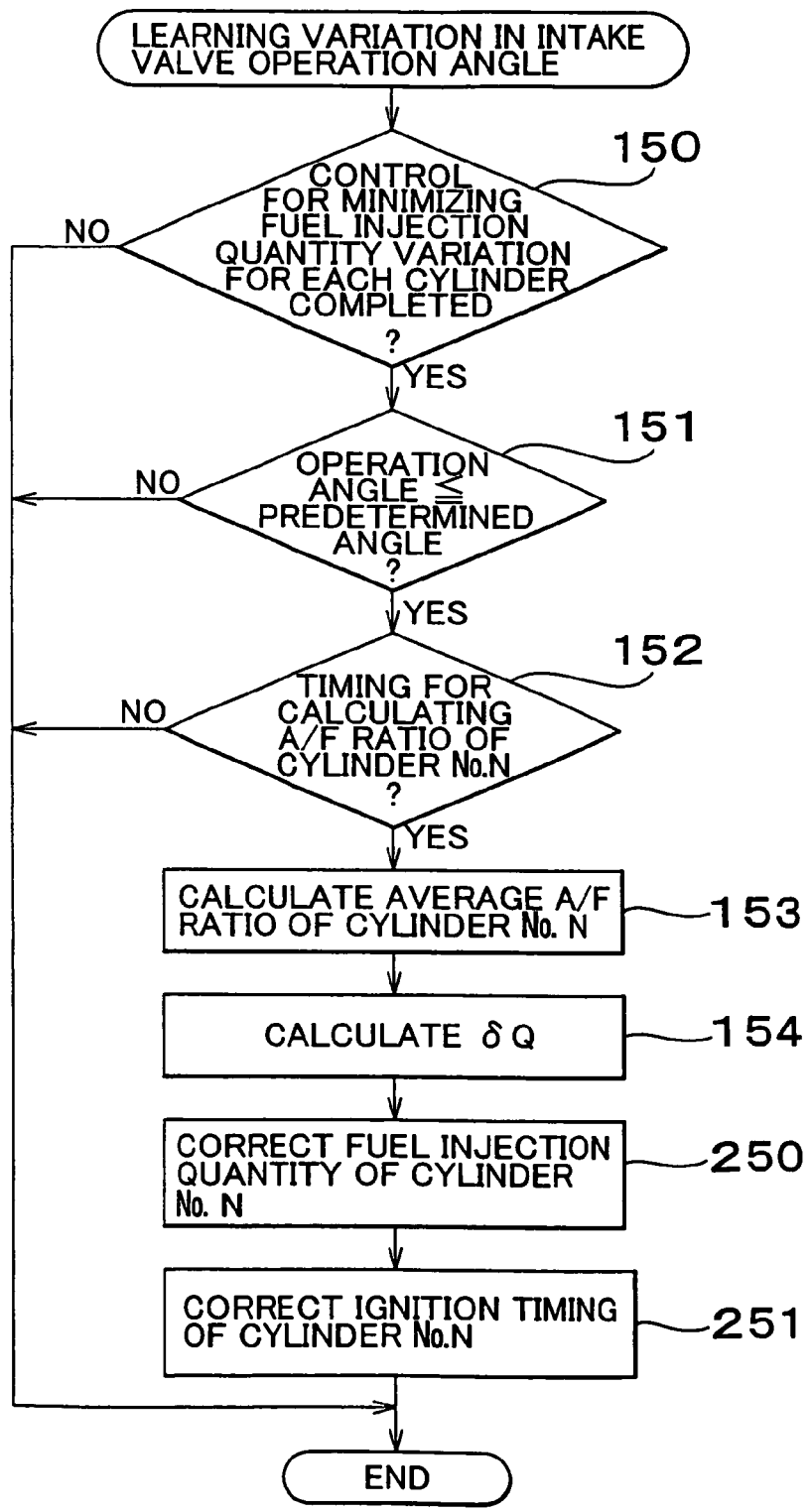
FIG. 13 is a flow chart showing a method for learning intake valve operation angle variation according to the first and second embodiments, as well as modifications thereof.

A routine according to the method for learning intake valve operation angle variation, according to the embodiment for controlling the first and the second type of the internal combustion engines and modifications thereof, shown in FIG. 13 is executed at predetermined intervals, just as is the routine shown in FIG. 11. As shown in FIG. 13, when this routine starts, it is first determined in Step 150 whether the control for reducing the variation in the fuel injection quantity in Step 105 shown in FIG. 11 has been completed, just as in FIG. 12. If the control is not yet complete, it is determined that the variation in the operation angle of the intake valve 2 among the cylinders can not be reduced. Accordingly the routine ends. If the correction of the fuel injection quantity for all of the cylinders is complete, the process proceeds to Step 151. In Step 151, just as in FIG. 12, it is determined whether the operation angle of the intake valve 2 is equal to or less than a predetermined threshold value. If the determination is "NO", the routine ends. If the determination is "YES", the process proceeds to Step 152.

In Step 152, it is determined whether it is time to calculate the exhaust gas air-fuel ratio of the specified cylinder, for example, the cylinder No. N, among a plurality of cylinders Nos. 1 through 4, just as in FIG. 12. If the determination is "NO", the routine ends. If the determination is "YES", the process proceeds to Step 153. In Step 153, the exhaust gas air-fuel ratio of the cylinder No. N, for example, is detected for several cycles and the mean air-fuel ratio thereof is calculated, just as in FIG. 12. Next in Step 154, the variation $\Delta Q$ in the intake air amount among the cylinders is calculated using the air-fuel ratio of each of the cylinders Nos. 1 through 4 calculated in Step 153 on the assumption that the fuel injection quantity in each of the cylinders Nos. 1 through 4 are all the same, also just as in FIG. 12.

Next in Step 250, the fuel injection quantity of each cylinder is corrected based on the variation $\Delta Q$ in the intake air amount among the cylinders calculated in Step 154 such that the torque of all of the cylinders Nos. 1 through 4 is the same. Then in Step 251, the ignition timing of each cylinder is corrected based on the variation $\Delta Q$ in the intake air amount among the cylinders calculated in Step 154 such that the torque of all of the cylinders Nos. 1 through 4 is the same. For example, the ignition timing in a cylinder in which the intake air amount is relatively large is retarded during operation under high load of the engine, in which knocking tends to occur.

According to the embodiment for controlling the first and second type of the internal combustion engines, after reducing the variation in the fuel injection quantity among the cylinders in Step 105 shown in FIG. 11, when it is determined in Step 151 shown in FIG. 13 that the valve opening characteristics of the intake valve 2 are set such that the intake air amount to be introduced into the cylinder is limited by the valve opening characteristics of the intake valve 2, and not limited by the opening amount of the throttle valve 56, the process proceeds to Step 153. In Step 153, the exhaust gas air-fuel ratio of that cylinder is calculated and then in Step 250 and Step 251, the fuel injection quantity and the ignition timing, respectively, are corrected so as to reduce the variation in torque among cylinders.

According to the foregoing embodiments and modifications thereof, after reducing the variation in the fuel injection quantity among the cylinders in Step 105 shown in FIG. 11, when it is determined in Step 151 in FIG. 13 that the valve opening characteristics of the intake valve 2 are set so that the intake air amount to be introduced into the cylinder is limited by the valve opening characteristics of the intake valve 2, and not limited by the cross-sectional area of the portion of the intake pipes 51 and 52 having the smallest internal circumference, the process proceeds to Step 153. In Step 153, the exhaust gas air-fuel ratio of that cylinder is calculated and then in Step 250 and Step 251 the fuel injection quantity and ignition timing, respectively, are corrected so as to reduce the variation in torque among the cylinders.

According to the embodiment for controlling the first to the third type of the internal combustion engine and the modifications thereof, the variation among cylinders is controlled based on the operation angle of the intake valve. More specifically, when it is determined in Step 151 shown in FIG. 13 whether the operation angle of the intake valve 2 is equal to or less than a predetermined threshold value, the variation in the air-fuel ratio among the cylinders is controlled in Step 250. Therefore, when it is possible to change the operation angle of the intake valve, the variation in the air-fuel ratio among the cylinders can be controlled more appropriately than when the variation in the air-fuel ratio among the cylinders is controlled irrespective of the aforementioned threshold value. In other words, it is possible to appropriately control the variation in the air-fuel ratio among the cylinders.

Hereinafter, additional embodiments of a control apparatus for an internal combustion engine according to the invention will be described. The configurations of these embodiments are substantially the same as the configurations of each of the foregoing embodiments. Also, configurations of modifications of these embodiments are substantially the same as the configurations of the foregoing modifications of each of the embodiments.

Figure 14:
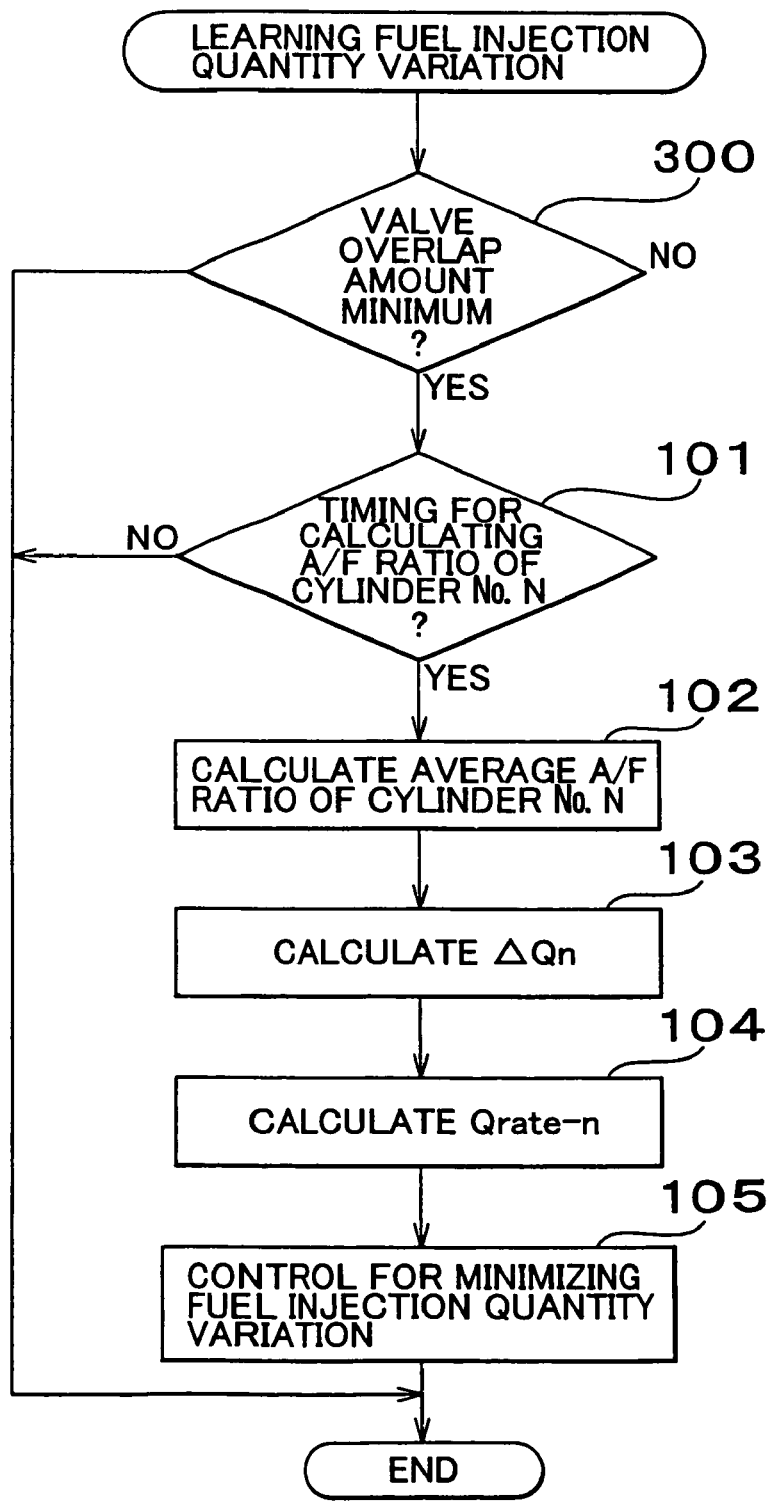
FIG. 14 is a flow chart showing a method for learning fuel injection quantity variation according to a fourth embodiment through a sixth embodiment, as well as modifications thereof.

A routine according to the method for learning fuel injection quantity variation according to the foregoing embodiments and modifications thereof as shown in FIG. 14 is executed at predetermined intervals just as the routine shown in FIG. 11. Referring to FIG. 14, when this routine starts, it is first determined in Step 300 whether a valve overlap amount of the intake valve 2 and the exhaust valve 3 is minimum. When the determination is "NO", i.e., when the valve overlap amount of the intake valve 2 and the exhaust valve 3 is relatively large, the intake air amount to be introduced into the cylinder 50 is determined by the valve overlap amount of the intake valve 2 and the exhaust valve 3. When there is temporary variation in the valve overlap amount between the cylinders, a variation in the intake air amount is generated and it is determined that variation in the fuel injection quantity cannot be learned, and the routine ends. However, when the determination in Step 300 is "YES", the intake air amount to be introduced into the cylinder 50 is determined by the opening amount of the throttle valve 56 or the cross-sectional of the portion of the intake pipes 51 and 52 having the smallest internal circumference, because the blow back gas amount from the cylinder 50 to the intake pipe 51 is small. Even when there is a variation in the valve overlap amount of the intake valve 2 and the exhaust valve 3 among the cylinders, it is determined that no variation in the intake air amount is generated between the cylinders, and the process proceeds to Step 101.

In Step 101, it is determined whether it is time to calculate the exhaust gas air-fuel ratio of the specified cylinder, for example, the cylinder No. N, among a plurality of cylinders Nos. 1 through 4, just as was shown in FIG. 11. When the determination is "NO", the routine ends. When the determination is "YES", the process proceeds to Step 102. In Step 102, the exhaust gas air-fuel ratio of the cylinder No. N, for example, is detected for several cycles and the mean air-fuel ratio thereof is calculated, just as was shown in FIG. 11. Next in Step 103, a variation $\Delta Qn$ in the fuel injection quantity among the cylinders detected in Step 102 is calculated using the air-fuel ratio of each of the cylinders Nos. 1 through 4, just as was shown in FIG. 11.

Next in Step 104, a variation rate Qrate-n of the fuel injection quantity is calculated based on the variation $\Delta Qn$ in the fuel injection quantity among the cylinders calculated in Step 103, just as was shown in FIG. 11. Then in Step 105, the fuel injection quantity of each of the cylinders Nos. 1 through 4 is corrected so as to reduce the variation in the fuel injection quantity among the cylinders, just as was shown in FIG. 11.

According to the embodiments, when it is determined in Step 300 that the valve overlap amount of the intake valve 2 and the exhaust valve 3 is set to the minimum value, the exhaust gas air-fuel ratio of that cylinder is then calculated in Step 102. That is, when it is determined in Step 300 that the valve overlap amount of the intake valve 2 and the exhaust valve 3 is set so as not to limit the intake air amount to be introduced into the cylinder, the exhaust gas air-fuel ratio of that cylinder is then calculated in Step 102. More specifically, when it is determined in Step 300 that the valve overlap amount of the intake valve 2 and the exhaust valve 3 is set such that the intake air amount to be introduced into the cylinder is limited by the opening amount of the throttle valve 56, and not limited by the valve overlap amount, the exhaust gas air-fuel ratio of that cylinder is calculated in Step 102. In other words, for the exhaust gas air-fuel ratio of a cylinder to be calculated in Step 102, the valve overlap amount of the intake valve 2 and the exhaust valve 3 is set, in a step which is not shown, such that the intake air amount to be introduced into that cylinder is limited by the opening amount of the throttle valve 56, and not limited by the valve overlap amount of the intake valve 2 and the exhaust valve 3. That is, by making the opening amount of the throttle valve 56 when the exhaust gas air-fuel ratio of the first cylinder No. 1 is calculated and the opening amount of the throttle valve 56 when the exhaust gas air-fuel ratios of the other cylinders Nos. 2 through 4 are calculated substantially the same, it is possible to make the intake air amount to be introduced into the first cylinder No. 1 upon calculation of the exhaust gas air-fuel ratio thereof and the intake air amount to be introduced into the other cylinders Nos. 2 through 4 upon calculation of the exhaust gas air-fuel ratios thereof the same.

Further, in the embodiments, when it is determined in Step 300 that the intake air amount to be introduced into the cylinder No. 1 when the exhaust gas air-fuel ratio thereof is calculated and the intake air amount to be introduced into the other cylinders Nos. 2 through 4 when the exhaust gas air-fuel ratios thereof are calculated are the same, the variation in the fuel injection quantity among the cylinders is reduced in Step 105 based on the exhaust gas air-fuel ratio. That is, after making the intake air amount in all of the cylinders the same, the fuel injection quantity is corrected such that the exhaust gas air-fuel ratios in all of the cylinders are the same. This allows both the variation in the air-fuel ratio among cylinders, as well as the variation in the torque among cylinders, to be reduced.

In other words, according to the embodiments, when it is determined in Step 300 that the valve opening characteristics of the intake valve 2 and the exhaust valve 3 are set such that the intake air amount to be introduced into the cylinder is limited by the opening amount of the throttle valve 56, and not limited by the valve opening characteristics of the intake valve 2 and the exhaust valve 3, the exhaust gas air-fuel ratio of that cylinder is then calculated in Step 102. That is, for the exhaust gas air-fuel ratio of a cylinder to be calculated in Step 102, the valve opening characteristics of the intake valve 2 and the exhaust valve 3 are set, in a step which is not shown, such that the intake air amount to be introduced into that cylinder is limited by the opening amount of the throttle valve 56, and not limited by the valve opening characteristics of the intake valve 2 and the exhaust valve 3.

Also, according to modifications of the embodiments in which the throttle valve 56 is not provided, just as in the embodiments, when it is determined in Step 300 that the valve overlap amount of the intake valve 2 and the exhaust valve 3 is set to the minimum value, the exhaust gas air-fuel ratio of that cylinder is calculated in Step 102. That is, when it is determined in Step 300 that the valve overlap amount of the intake valve 2 and the exhaust valve 3 is set so as not to limit the intake air amount to be introduced into the cylinder, the exhaust gas air-fuel ratio of that cylinder is then calculated in Step 102. More specifically, when it is determined in Step 300 that the valve overlap amount of the intake valve 2 and the exhaust valve 3 is set such that the intake air amount to be introduced into the cylinder is limited by the cross-sectional area of a portion of the intake pipes 51 and 52 having the smallest internal circumference, and not limited by the valve overlap amount of the intake valve 2 and the exhaust valve 3, the exhaust gas air-fuel ratio of that cylinder is then calculated in Step 102. In other words, for the exhaust gas air-fuel ratio of a cylinder to be calculated in Step 102, the valve overlap amount of the intake valve 2 and the exhaust valve 3 are set, in a step which is not shown, to the minimum value such that the intake air amount to be introduced into the cylinder is limited by the cross-sectional area of a portion of the intake pipes 51 and 52 having the smallest internal circumference, and not limited by the valve overlap amount of the intake valve 2 and the exhaust valve 3.

In other words, according to modifications of the embodiments, when it is determined in Step 300 that the valve opening characteristics of the intake valve 2 and the exhaust valve 3 are set such that the intake air amount to be introduced into the cylinder is limited by the cross-sectional area of a portion of the intake pipes 51 and 52 having the smallest internal circumference, and not limited by the valve opening characteristics of the intake valve 2 and the exhaust valve 3, the exhaust gas air-fuel ratio of that cylinder is then calculated in Step 102. That is, for the exhaust gas air-fuel ratio of a cylinder to be calculated in Step 102, the valve opening characteristics of the intake valve 2 and the exhaust valve 3 are set, in a step which is not shown, such that the intake air amount to be introduced into that cylinder is limited by the cross-sectional area of a portion of the intake pipes 51 and 52 having the smallest internal circumference, and not limited by the valve opening characteristics of the intake valve 2 and the exhaust valve 3.

Also, according to the foregoing embodiments and modifications, the variation among cylinders is able to be reduced based on the valve overlap amount of the intake valve 2 and the exhaust valve 3. More specifically, the variation in the fuel injection quantity among cylinders can be reduced based on the valve overlap amount of the intake valve 2 and the exhaust valve 3. Even more specifically, when it is determined in Step 300 in FIG. 14 that the valve overlap amount of the intake valve 2 and the exhaust valve 3 is set to the minimum value, the variation in the fuel injection quantity among the cylinders is reduced in Step 105. Therefore, when it is possible to change the valve overlap amount of the intake valve and the exhaust valve, the variation in the air-fuel ratio among the cylinders can be controlled more appropriately than when the variation among cylinders is not reduced based on the valve overlap amount of the intake valve and the exhaust valve. In other words, it is possible to appropriately control the variation in the air-fuel ratio among the cylinders.

Figure 15:
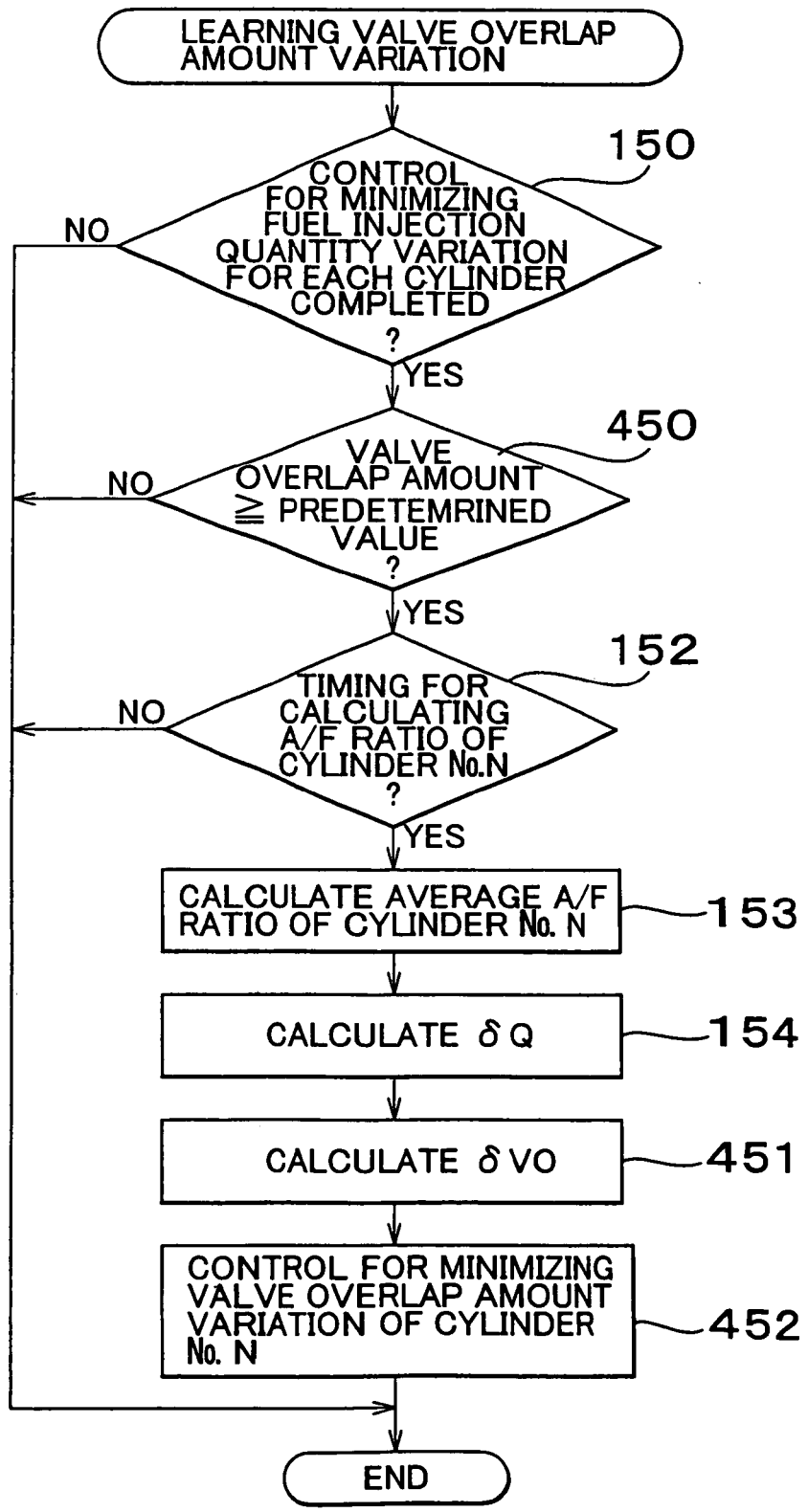
FIG. 15 is a flow chart showing a method for learning valve overlap amount variation according to the sixth embodiment, as well as a modification thereof.

A routine according to the method for learning valve overlap amount variation, according to another embodiment and a modification thereof, in FIG. 15 is executed at predetermined intervals, just as the routine shown in FIG. 14. Referring to FIG. 15, when this routine starts, it is first determined in Step 150 whether the control in Step 105 in FIG. 14 has been completed. If the correction of the fuel injection quantity for all of the cylinders is not yet complete, it is determined that the variation in the valve overlap amount of the intake valve 2 and the exhaust valve 3 among the cylinders can not be reduced and the routine ends. If the correction of the fuel injection quantity for all of the cylinders is complete, then the process proceeds to Step 450. In Step 450, it is determined whether the valve overlap amount of the intake valve 2 and the exhaust valve 3 is equal to or greater than a predetermined threshold value. That is, it is determined whether the valve overlap amount of the intake valve 2 and the exhaust valve 3 is set to a relatively large value such that the intake air amount to be introduced into the cylinder is limited by the valve overlap amount of the intake valve 2 and the exhaust valve 3, and not limited by the opening amount of the throttle valve 56. If the determination in step 450 is "NO", the routine ends. If the determination is "YES", the process proceeds to Step 152.

In Step 152, it is determined whether it is time to calculate the exhaust gas air-fuel ratio of the specified cylinder, for example, the cylinder No. N, among a plurality of cylinders Nos. 1 through 4, just as was shown in FIG. 12. If the determination is "NO", the routine ends. If the determination is "YES", the process proceeds to Step 153. In Step 153, the exhaust gas air-fuel ratio of the cylinder No. N, for example, is detected for several cycles and the mean air-fuel ratio thereof is calculated, just as in FIG. 12. Next, in Step 154, the variation ΔQ in the intake air amount among the cylinders is calculated using the air-fuel ratio of each of the cylinders Nos. 1 through 4 calculated in Step 153 on the assumption that the fuel injection quantities of all of the cylinders Nos. 1 through 4 are the same.

Next in Step 451, a variation ΔVo in the valve overlap amount of the intake valve 2 and the exhaust valve 3 of the specified cylinder, for example, cylinder No. N, is calculated based on the variation ΔQ in the intake air amount among the cylinders calculated in Step 154. This calculation of the variation ΔVo in the valve overlap amounts of the intake valves 2 and the exhaust valves 3 is performed for all of the cylinders Nos. 1 through 4. Next in Step 452, the intake valve driving device 58 corrects the opening timing of the intake valves 2 of each of the cylinders Nos. 1 through 4, while the intake valve driving device 58' corrects the closing timing of the exhaust valves 3 of each of the cylinders Nos. 1 through 4, such that the variation in the valve overlap amounts of the intake valves 2 and exhaust valves 3 among the cylinders is reduced, i.e., such that the variation in the intake air amount among the cylinders is reduced.

According to the embodiment, after reducing the variation in the fuel injection quantity among the cylinders in Step 105 in FIG. 14, when it is determined in Step 450 in FIG. 15 that the valve opening characteristics of the intake valve 2 and the exhaust valve 3 are set so that the intake air amount to be introduced into the cylinder is limited by the valve opening characteristics of the intake valve 2 and the exhaust valve 3, and not limited by the opening amount of the throttle valve 56, the process proceeds to Step 153. In Step 153, the exhaust gas air-fuel ratio of that cylinder is calculated and then in Step 452, the variation in the valve opening characteristics of the intake valve 2 and the exhaust valve 3 among cylinders is reduced based on that exhaust gas air-fuel ratio. That is, after reducing the variation in the fuel injection quantity among the cylinders, the valve opening characteristics of the intake valves 2 and exhaust valves 3 of each of the cylinders Nos. 1 through 4 are changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among cylinders, no variation in torque among cylinders is generated and the variation in the valve opening characteristics of the intake valves 2 and exhaust valves among the cylinders can be reduced.

Also according to a modification of the embodiment, after reducing the variation in the fuel injection quantity among the cylinders in Step 105 in FIG. 14, when it is determined in Step 450 in FIG. 15 that the valve opening characteristics of the intake valve 2 and the exhaust valve 3 are set so that the intake air amount to be introduced into the cylinder is limited by the valve opening characteristics of the intake valve 2 and the exhaust valve 3, and not limited by the cross-sectional area of the portion of the intake pipes 51 and 52 having the smallest internal circumference, the process proceeds to Step 153. In Step 153, the exhaust gas air-fuel ratio of that cylinder is calculated and then in Step 452, the variation in the valve opening characteristics of the intake valve 2 and exhaust valve 3 among cylinders is reduced based on that exhaust gas air-fuel ratio. That is, after reducing the variation in the fuel injection quantity among the cylinders, the valve opening characteristics of the intake valves 2 and exhaust valves 3 of each of the cylinders Nos. 1 through 4 are changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among cylinders, no variation in torque among cylinders is generated and the variation in the valve opening characteristics of the intake valves 2 and exhaust valves 3 among the cylinders can be reduced.

More specifically, according to the embodiment and modification thereof, after reducing the variation in the fuel injection quantity among the cylinders in Step 105 in FIG. 14, when it is determined in Step 450 in FIG. 15 that the valve overlap amount of the intake valve 2 and the exhaust valve 3 is set to the minimum value, the process proceeds to Step 153. In Step 153, the exhaust gas air-fuel ratio is calculated and then in Step 451, the variation in the valve overlap amount of the intake valve 2 and the exhaust valve 3 among cylinders is reduced based on that exhaust gas air-fuel ratio. That is, after reducing the variation in the fuel injection quantity among the cylinders, the valve overlap amount of the intake valve 2 and the exhaust valve 3 of each of the cylinders Nos. 1 through 4 is changed such that the exhaust gas air-fuel ratio of the cylinder No. 1 and the exhaust gas air-fuel ratios of the other cylinders Nos. 2 through 4 are the same. Therefore, even if there is variation in the fuel intake quantity among cylinders, no variation in torque among cylinders is generated and the variation in the valve overlap amount of the intake valve 2 and the exhaust valve 3 among the cylinders can be reduced.

In other words, according to the embodiment and the modification thereof, after reducing the variation in the fuel injection quantity among the cylinders in Step 105 in FIG. 14, when it is determined in Step 450 in FIG. 15 that the valve overlap amount of the intake valve 2 and the exhaust valve 3 is set to a predetermined valve overlap amount that is larger than the minimum valve overlap amount, the process proceeds to Step 153. In Step 153, the exhaust gas air-fuel ratio is calculated and then in Step 452 the variation in the intake air amount among cylinders is reduced with that exhaust gas air-fuel ratio. That is, after reducing the variation in the fuel injection quantity among the cylinders, the valve overlap amount of the intake valve 2 and the exhaust valve 3 of each of the cylinders Nos. 1 through 4 is changed such that the exhaust gas air-fuel ratio of the cylinder No. 1 and the exhaust gas air-fuel ratios of the other cylinders Nos. 2 through 4 are the same. Therefore, even if there is variation in the fuel intake quantity between cylinders, no variation in torque between cylinders is generated and the variation in the intake air amount between the cylinders can be reduced.

Also according to the embodiment and the modification thereof a variation among cylinders is reduced by the valve overlap amount of the intake valve and the exhaust valve. More specifically, when it is determined in Step 450 in FIG. 15 that the valve overlap amount of the intake valve 2 and the exhaust valve 3 is equal to, or greater than, a predetermined threshold value, the variation in the valve overlap amount of the intake valve 2 and the exhaust valve 3 among the cylinders is reduced in Step 452. Therefore, when it is possible to change the valve overlap amount of the intake valve and the exhaust valve, it is possible to control the variation in the air-fuel ratio between the cylinders more appropriately than when the variation in the valve overlap amount of the intake valve 2 and the exhaust valve 3 between the cylinders is controlled irregardless of the aforementioned threshold value. In other words, it is possible to appropriately control the variation in the air-fuel ratio among the cylinders.

Figure 16:
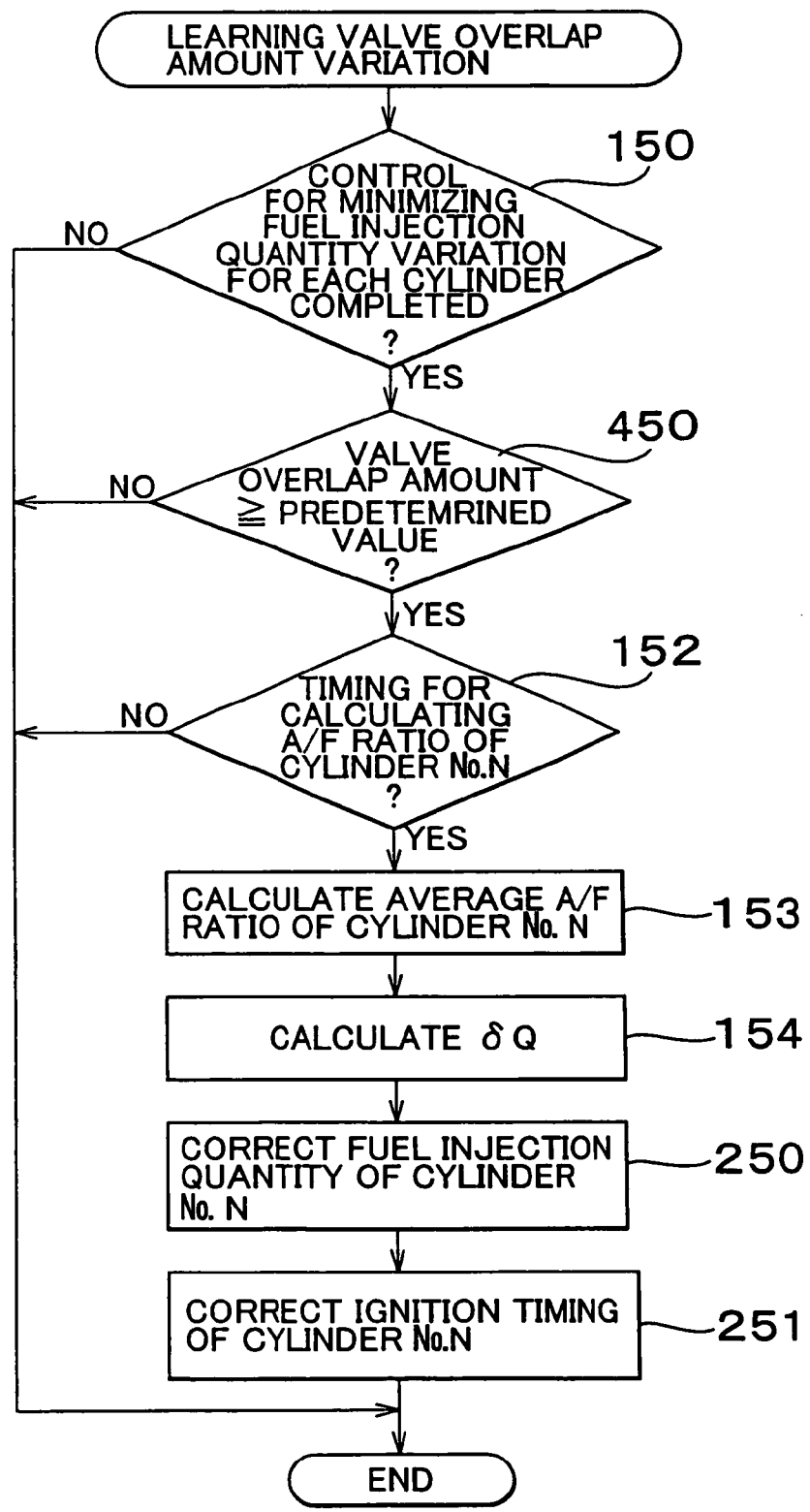
FIG. 16 is a flow chart showing a method for learning valve overlap amount variation according to the fourth and fifth embodiments, as well as modifications thereof.

A routine according to the method for learning intake valve operation angle variation, according to the foregoing embodiments and modifications thereof, in FIG. 16 is performed at predetermined intervals, just as the routine shown in FIG. 14. As shown in FIG. 16, when this routine starts, it is first determined in Step 150 whether the correction control in Step 105 in FIG. 14 has been completed, just as in FIG. 15. If the correction is not yet complete, it is determined that the variation in the valve overlap amount of the intake valve 2 and the exhaust valve 3 among the cylinders can not be reduced and the routine ends. If the correction of the fuel injection quantity for all of the cylinders is complete, then the process proceeds to Step 450. In Step 450, it is determined whether the valve overlap amount of the intake valve 2 and exhaust valve 3 is equal to or greater than a predetermined threshold value, just as in FIG. 15. If the determination is "NO", the routine ends. If the determination is "YES", the process proceeds to Step 152.

In Step 152, it is determined whether it is time to calculate the exhaust gas air-fuel ratio of a specified cylinder, for example, the cylinder No. N, among a plurality of cylinders Nos. 1 through 4, just as in FIG. 15. If the determination is "NO", the routine ends. If the determination is "YES", the process proceeds to Step 153. In Step 153, the exhaust gas air-fuel ratio of the cylinder No. 1, for example, is detected for several cycles and the mean air-fuel ratio thereof is calculated, just as in FIG. 15. Next in Step 154, the variation ΔQ in the intake air amount among the cylinders is calculated using the air-fuel ratio of each of the cylinders Nos. 1 through 4 calculated in Step 153 on the assumption that the fuel injection quantity in each of the cylinders Nos. 1 through 4 are the same, just as in FIG. 15.

Next in Step 250, the fuel injection quantity of each cylinder is corrected based on the variation ΔQ in the intake air amount among the cylinders calculated in Step 154 such that the torque of all of the cylinders Nos. 1 through 4 is the same, just as in FIG. 13. Then in Step 251, just as in FIG. 13, the ignition timing of each cylinder is corrected based on the variation ΔQ in the intake air amount among the cylinders calculated in Step 154 such that the torque of all of the cylinders Nos. 1 through 4 is the same. For example, the ignition timing in a cylinder in which the intake air amount is relatively large is retarded during operation under high load of the engine, which tends to cause knocking.

According to the foregoing embodiments, after reducing the variation in the fuel injection quantity among the cylinders in Step 105 in FIG. 14, when it is determined in Step 450 in FIG. 16 that the valve opening characteristics of the intake valve 2 and the exhaust valve 3 are set so that the intake air amount to be introduced into the cylinder is limited by the valve opening characteristics of the intake valve 2 and the exhaust valve 3, and not limited by the opening amount of the throttle valve 56, the process proceeds to Step 153. In Step 153, the exhaust gas air-fuel ratio of that cylinder is calculated and then in Step 250 and Step 251, the fuel injection quantity and ignition timing, respectively, are corrected so as to reduce the variation in torque among the cylinders.

Also according to the foregoing embodiments and modifications thereof, after reducing the variation in the fuel injection quantity among the cylinders in Step 105 in FIG. 14, when it is determined in Step 450 in FIG. 16 that the valve opening characteristics of the intake valve 2 and the exhaust valve 3 are set so that the intake air amount to be introduced into the cylinder is limited by the valve opening characteristics of the intake valve 2 and the exhaust valve 3, and not limited by the cross-sectional area of the portion of the intake pipes 51 and 52 having the smallest internal circumference, the process proceeds to Step 153. In Step 153, the exhaust gas air-fuel ratio of that cylinder is calculated and then in Step 250 and Step 251, the fuel injection quantity and ignition timing, respectively, are corrected so as to reduce the variation in torque among cylinders.

Also according to the foregoing embodiments and modifications thereof, the variation among cylinders is controlled by the valve overlap amount of the intake valve and the exhaust valve. More specifically, when it is determined in Step 450 in FIG. 16 that the valve overlap amount of the intake valve 2 and the exhaust valve 3 is equal to or greater than a predetermined threshold value, the variation in the air-fuel ratio among the cylinders is reduced in Step 250. Therefore, when it is possible to change the valve overlap amount of the intake valve and the exhaust valve, the variation in the air-fuel ratio among the cylinders can be controlled more appropriately than when the variation in the air-fuel ratio among the cylinders is controlled irrespective of the aforementioned threshold. In other words, it is possible to appropriately control the variation in the air-fuel ratio among the cylinders.

Figure 17:
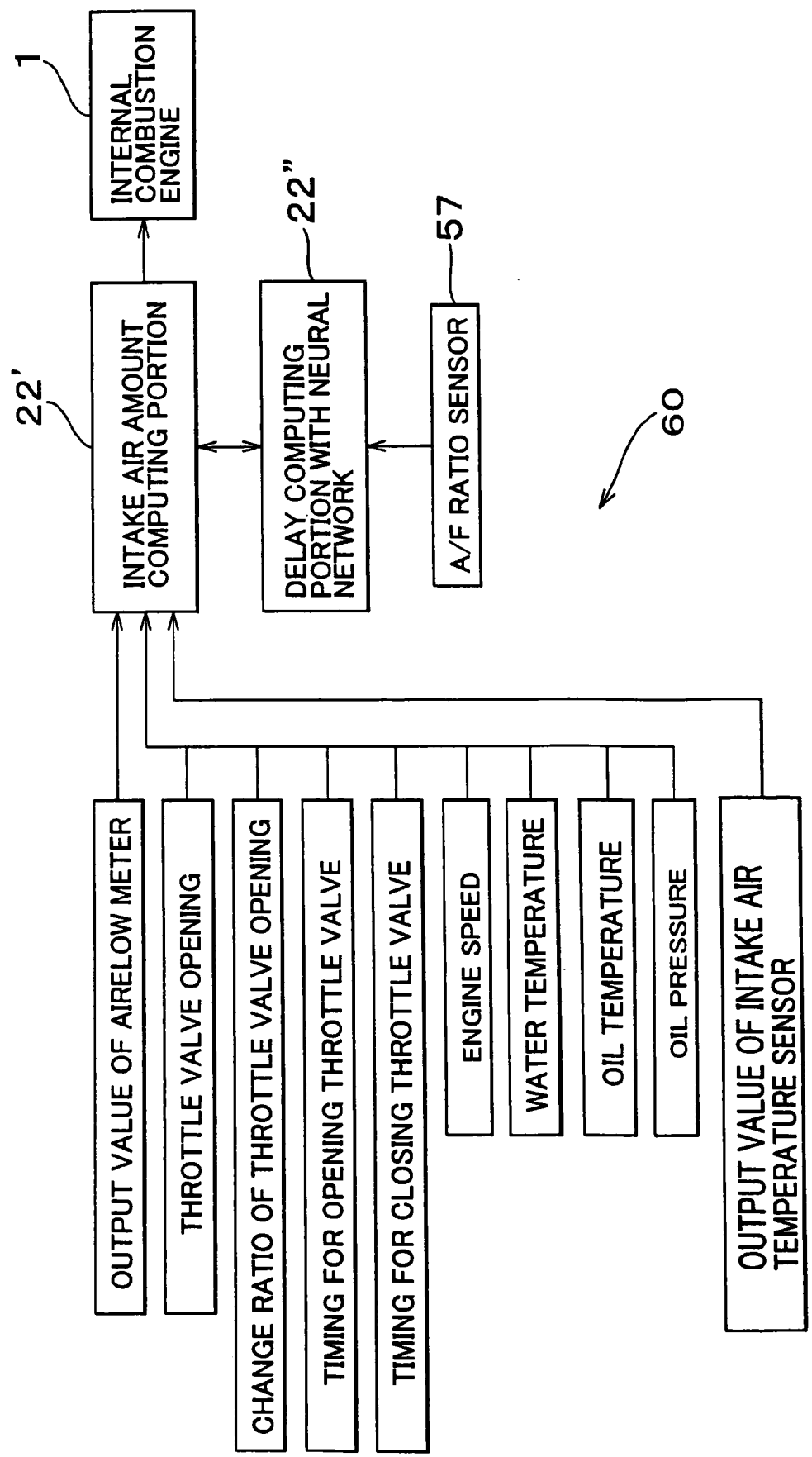
FIG. 17 is a schematic block diagram of a control apparatus for an internal combustion engine according to a seventh embodiment.

Hereinafter, an another embodiment of a control apparatus for an internal combustion engine according to the invention will be described. The configuration of this embodiment is a combination of the configuration of the foregoing embodiments and modifications thereof and the configuration described below. In FIG. 17, reference numerals that are the same as those in FIGS. 1 through 10 represent the same or like parts as those shown in FIGS. 1 through 10. FIG. 17 also shows an intake air amount calculating portion 22' which constitutes a portion of the ECU 22, a neural network 60 which is of a construction substantially the same as that of the well-known neural network disclosed in Japanese Patent Application Laid-Open Publication No. 9-88685, for example, and a delay calculating portion 22" using the neural network 60, which constitutes another portion of the ECU 22.

In this embodiment, the variation among the cylinders is reduced using the neural network 60 in order to compensate for the delay from the valve lift amount changing device 9, 9', the opening/closing timing shift device 11, 11', the intake valve driving device 58, and the exhaust valve driving device 58' during times of excessive driving of the engine. Specifically, when the intake air amount is calculated during times of excessive driving of the engine, the intake air amount is estimated based on the value output from the airflow meter 19, the opening amount of the throttle valve 56, the rate of change of the throttle valve opening amount, the valve opening timing of the intake valve 2, the valve closing timing of the intake valve 2, the engine speed, the water temperature, the oil temperature, the oil pressure, and the value output from the intake air temperature sensor 21. The neural network 60 is able to learn the delay from the difference between that intake air amount and an air amount calculated based on the value output from the air-fuel ratio sensor 57. As a result, the actual air-fuel ratio can be matched extremely accurately to the target air-fuel ratio under any condition.

That is, the neural network is applied for the calculating portion that calculates the intake air amount delay, and the intake air amount is calculated based on the above-described data. The error, or difference, between the fuel injection quantity calculated based on that intake air amount and the actual exhaust gas air-fuel ratio of that cycle is then detected. By repeating this with various patterns and correcting the sensitivity coefficient of each parameter, the actual air-fuel ratio is able to be matched extremely accurately to the target air-fuel ratio under any operating condition of the engine.

Hereinafter, another embodiment of a control apparatus for an internal combustion engine according to the invention will be described. The configuration of this embodiment is substantially the same as any of the configurations of the foregoing embodiments and modifications thereof. Alternatively, the eighth embodiment may also comprise a plurality of intake valve cams with different cam profiles, not shown, wherein the valve opening characteristics of each intake valve is able to be changed by changing the intake valve cam.

Figure 18:
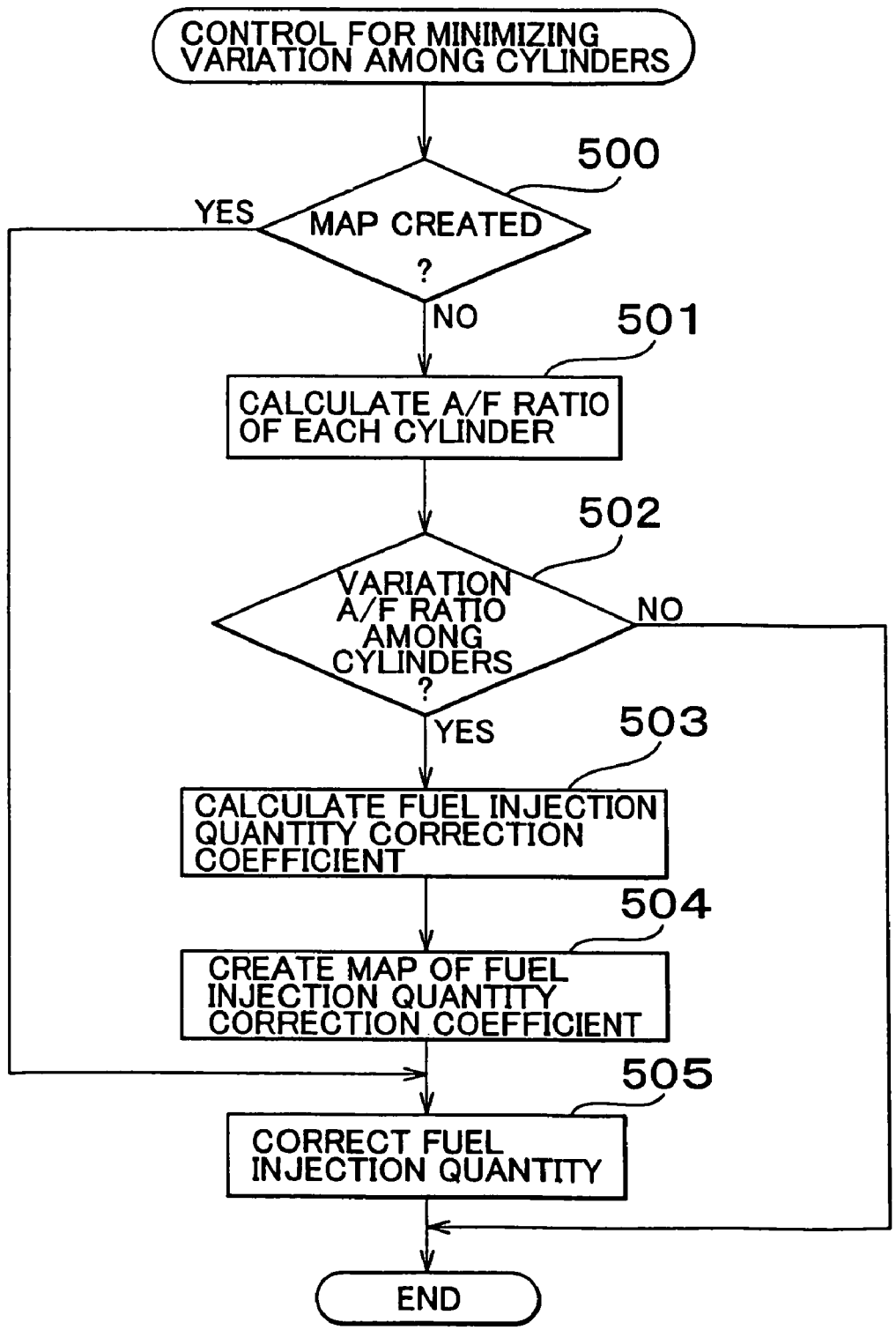
FIG. 18 is a flow chart showing a method for controlling so as to minimize variation between cylinders according to an eighth embodiment.

A routine according to the method for controlling to minimize variation between cylinders according to the foregoing embodiment and the modification thereof, is performed at predetermined intervals. As shown in FIG. 18, when this routine starts, it is first determined in Step 500 whether a map, to be described later, has already been created. If the determination is "YES", the process proceeds to Step 505. If the determination is "NO", the process proceeds to Step 501. In Step 501, the air-fuel ratio of each of the cylinders Nos. 1 through 4 in a constant state, such as when the engine is idling, is calculated based on a value output from the air-fuel ratio sensor 57 by a method such as that disclosed in Japanese Patent Application Laid-Open Publication No. 59-101562 or Japanese Patent Application Laid-Open Publication No. 5-180040.

Next in Step 502, it is determined whether there is variation in the air-fuel ratio among the cylinders. When variation in the air-fuel ratio between the cylinders is less than a predetermined value, the routine ends. When variation in the air-fuel ratio among the cylinders is equal to or greater than the predetermined value, the process proceeds to Step 503. In Step 503, fuel injection amount correction coefficients for each of the cylinders Nos. 1 through 4 are calculated based on the calculated air-fuel ratios of each of the cylinders Nos. 1 through 4, respectively. For example, when the actual air-fuel ratio of a cylinder varies on the rich side with respect to the target air-fuel ratio, a fuel injection amount correction coefficient is calculated which has a relatively small value so as to correct with a decrease the fuel injection amount of that cylinder. On the other hand, when the actual air-fuel ratio of a cylinder varies on the lean side with respect to the target air-fuel ratio, a fuel injection amount correction coefficient is calculated which has a relatively large value so as to correct with an increase the fuel injection amount of that cylinder.

Figure 19:
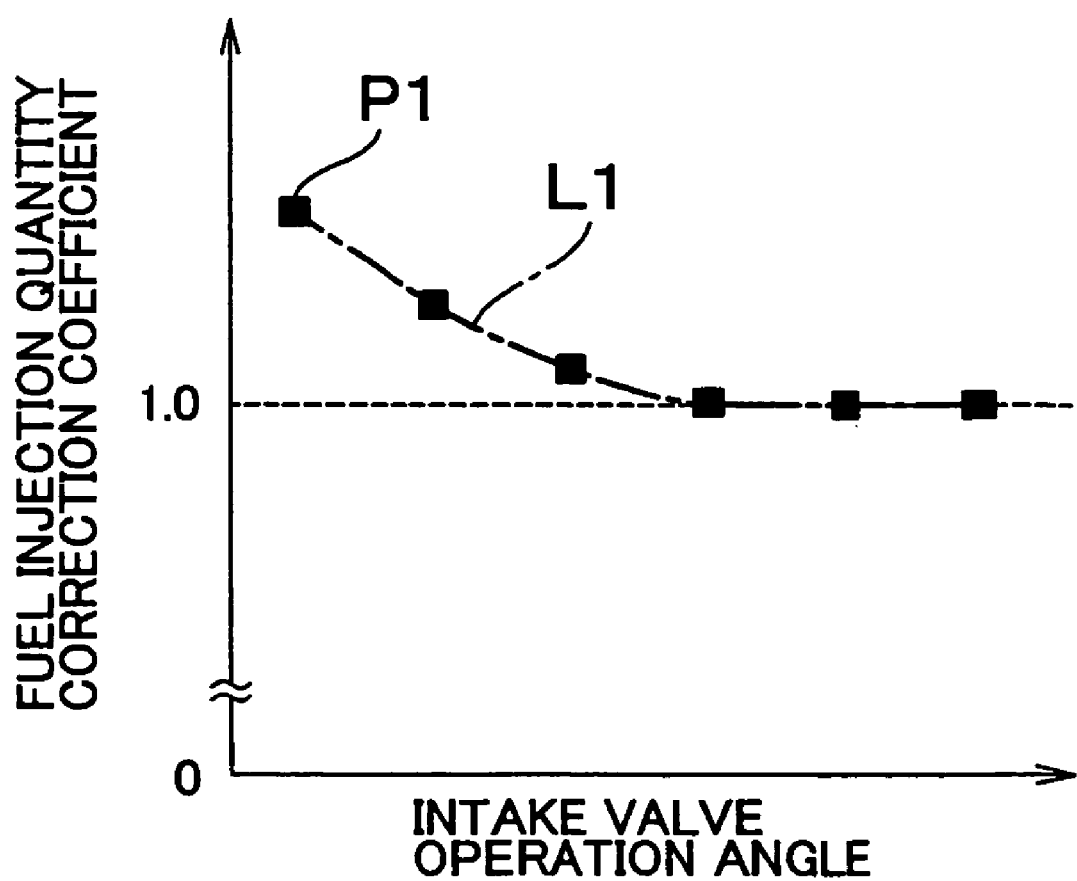
FIG. 19 is a graph showing a relationship between the fuel injection quantity correction coefficient and the operation angle of an intake valve.

Next in Step 504, a fuel injection quantity correction coefficient map, which shows the relationship between the fuel injection quantity correction coefficient and the operation angle of the intake valve 2, is created based on the fuel injection amount quantity correction coefficient calculated in Step 503 and the operation angle of the intake valve 2 at that time. As shown in FIG. 19, when a point P1 is calculated in Step 503, a curved line L1 showing the relationship between the fuel injection quantity correction coefficient and the operation angle of the intake valve is calculated from that point P1, and a fuel injection quantity correction coefficient map is created based on that curved line L1. According to a modification of the eighth embodiment, in Step 504 it is possible to calculate a relational expression that simplifies the curved line L1 instead of creating the map. Also according to a modification of the embodiment, it is possible to calculate not only the point P1 but also a point P1' in a step similar to Step 503, calculate a curved line similar to the curved line L1 based on the point P1 and the point P1', and then create a fuel injection quantity correction coefficient map based on that curved line.

In Step 505, the fuel injection quantity for each of the cylinders Nos. 1 through 4 is corrected. That is, when the map shown in FIG. 19 has not been created such that the determination in Step 500 is "NO", a fuel injection quantity correction coefficient for correcting the fuel injection quantity is calculated in Step 503, and the fuel injection quantity is then corrected based on that fuel injection quantity correction coefficient in Step 505. On the other hand, when the map shown in FIG. 19 has already been created such that the determination in Step 500 is "YES", Step 503 is not performed even when the operation angle of the intake valve 2 has changed from the point at which the map was created, such that the fuel injection quantity is corrected in Step 505 based on the map that was already created.

When it is feared that hunting may occur when the aforementioned Step 505 is performed, the fuel injection quantity correction coefficients may be smoothed out in a step which is not shown, so that it is then possible to correct the fuel injection quantity in a step which replaces Step 505 based on the smoothed out fuel injection quantity correction coefficient. (In this case, the fuel injection quantity correction coefficients of all of the cylinders are corrected using the values of the smoothed out fuel injection quantity correction coefficients. The thus corrected fuel injection quantity correction coefficients are then repeatedly smoothed and re-corrected until they converge on a single fuel injection quantity correction coefficient for all of the cylinders. The fuel injection quantity is then corrected based on this single fuel injection quantity correction coefficient.)

According to the embodiment or the modification thereof, a variation between cylinders is reduced by the operation angle of the intake valve 2. More specifically, as shown in FIG. 19, the variation in the fuel injection quantity among cylinders is reduced by calculating the fuel injection quantity correction coefficient of each cylinder No. 1 through 4based on the operation angle of the intake valve 2, and correcting the fuel injection quantity in each cylinder No. 1 through 4 in Step 505 based on that fuel injection quantity correction coefficient. Therefore, when it is possible to change the operation angle of the intake valve, it is possible to control the variation in the air-fuel ratio among the cylinders more appropriately than when the variation between cylinders is not controlled by the operation angle of the intake valve.

Also according to the embodiment or the modification thereof, because the variation among the cylinders is controlled by the operation angle of the intake valve, it is possible to appropriately control the variation between the cylinders even when, for example, the sensor 57 is not sufficiently exposed to the exhaust gas such that a target air-fuel ratio calculated from a value output by a sensor is not an appropriate target air-fuel ratio.

Also, according to the embodiment or the modification thereof, the variation in the air-fuel ratio among the cylinders is reduced by correcting the fuel injection quantity in Step 505 based on the operation angle of the intake valve 2. For example, when the air-fuel ratio of a cylinder varies to the rich side, the variation in the air-fuel ratio among the cylinders is reduced by correcting with a decrease the fuel injection quantity of that cylinder. Also, the smaller the operation angle of the intake valve, the greater the variation in the air-fuel ratio among cylinders when the actual operation angle is off from the target operation angle. In view of this, as shown in FIG. 19, the difference between the fuel injection quantity correction coefficient and 1.0 is made to become larger as the operation angle of the intake valve becomes smaller. As a result, the variation in the air-fuel ratio among the cylinders is controlled by increasing the correction amount of the fuel injection quantity. This enables the variation in the air-fuel ratio among cylinders to be controlled more appropriately than when the fuel injection quantity is not corrected by the operation angle of the intake valve.

More specifically, when a variation in the air-fuel ratio among the cylinders is detected in Step 501 and Step 502, the fuel injection quantity correction coefficient for decreasing that variation is calculated in Step 503. Then in Step 504, a relationship L1 between the fuel injection quantity correction coefficient and the operation angle of the intake valve is calculated based on that fuel injection quantity correction coefficient and the operation angle of the intake valve at that time. When the operation angle of the intake valve changes, the fuel injection quantity correction coefficient after the intake valve operation angle change is calculated based on the operation angle of the intake valve after the change and that relationship L1.

Hereinafter an another embodiment of a control apparatus for an internal combustion engine according to the invention will be described. The configuration of this embodiment is substantially the same as that of the eighth embodiment described above.

Figure 20:
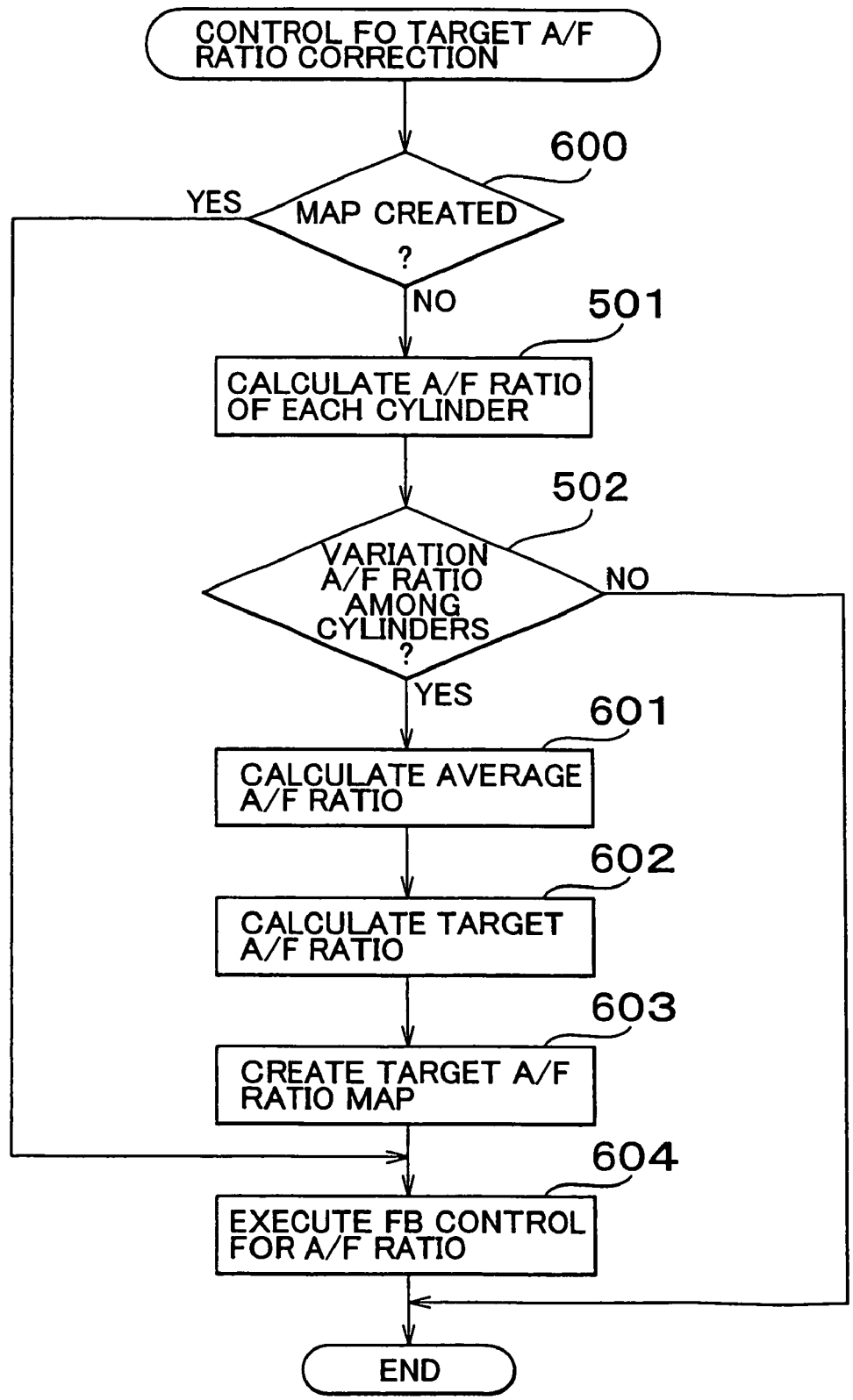
FIG. 20 is a flow chart showing a method for controlling so as to correct the target air-fuel ratio according to a ninth embodiment.

A routine according to the method for controlling to correct a target air-fuel ratio, according to the embodiment, is performed at predetermined intervals. As shown in FIG. 20, when this routine starts, it is first determined in Step 600 whether a map, to be described later, has already been created. If the determination is "YES", the process proceeds to Step 604. If the determination is "NO", the process proceeds to Step 501. In Step 501, the air-fuel ratio of each of the cylinders Nos. 1 through 4 in a constant state, such as when the engine is idling, is calculated based on a value output from the air-fuel ratio sensor 57, just as in the previous embodiment.

Next in Step 502, it is determined whether there is variation in the air-fuel ratio among the cylinders, just as in the previous embodiment. When the variation in the air-fuel ratio among the cylinders is less a predetermined value, the routine ends. When variation in the air-fuel ratio between the cylinders is equal to or greater than the predetermined value, the process proceeds to Step 601. In Step 601, a mean air-fuel ratio injection amount is calculated for all of the cylinders Nos. 1 through 4. The mean air-fuel ratio injection amount for all of the cylinders Nos. 1 through 4 is calculated, for example, by adding up the air-fuel ratios for each of the cylinders Nos. 1 through 4 and dividing the sum by 4. Next in Step 602, a new target air-fuel ratio (hereinafter referred to as "corrected target air-fuel ratio") is calculated based on the target air-fuel ratio which is based on the value output from the sensor 57 (hereinafter referred to as "sensor target air-fuel ratio") and, for example, a stoichiometric air-fuel ratio, and the mean air-fuel ratio calculated in Step 601. That is, the sensor target air-fuel ratio is corrected and the corrected target air-fuel ratio is calculated.

Corrected target air-fuel ratio=Sensor target air-fuel ratio×Stoichiometric air-fuel ratio/Mean air-fuel ratio (1)

When there is a fear of hunting from Expression (1) above, or when the accuracy of the mean air-fuel ratio calculated in Step 601 is low, the smoothed out corrected target air-fuel ratio can also be calculated, as shown in Expression (2). (In this case, the air-fuel ratios of all of the cylinders are calculated using the values of the smoothed out corrected target air-fuel ratios. The thus corrected target air-fuel ratios of all of the cylinders are then repeatedly smoothed and re-corrected until they converge on a single corrected target air-fuel ratio for all of the cylinders. A target air-fuel ratio map is then created in Step 603 using this single corrected target air-fuel ratio.

Corrected target air-fuel ratio=(Stoichiometric air-fuel ratio−mean air-fuel ratio)/k+sensor target air-fuel ratio (2);

wherein k is a positive integer.

Figure 21:
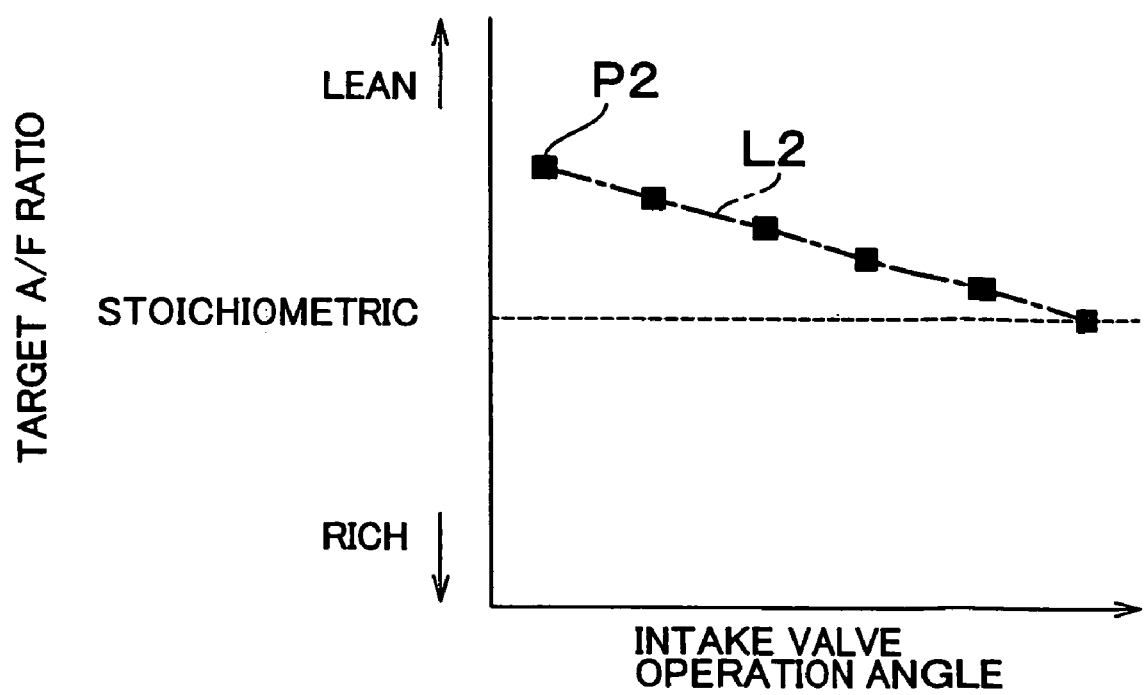
FIG. 21 is a graph showing a relationship between the target air-fuel ratio and the operation angle of an intake valve.

Next in Step 603, the target air-fuel ratio map showing the relationship between the corrected target air-fuel ratio and the operation angle of the intake valve 2 is created based on the corrected target air-fuel ratio calculated in Step 602 and the operation angle of the intake valve 2 at that time. As shown in FIG. 21, when a point P2 is calculated in Step 602, a curved line L2 showing the relationship between the corrected target air-fuel ratio and the operation angle of the intake valve is calculated from that point P2. The target air-fuel ratio map is then created based on that curved line L2. According to a modification of the ninth embodiment of the invention, in Step 603 it is possible to calculate a relational expression that simplifies the curved line L2 instead of creating the map. Also according to another modification of the embodiment, it is possible to calculate not only the point P2 but also a point P2' in a step similar to Step 602, calculate a curved line similar to the curved line L2 based on the point P2 and the point P2', and then create a fuel injection quantity correction coefficient map based on that curved line.

In Step 604, feedback control for the air-fuel ratio is performed. That is, a fuel injection quantity for all of the cylinders Nos. 1 through 4 is uniformly corrected based on the corrected target air-fuel ratio on the map created in Step 603. In other words, when the map shown in FIG. 21 has not been created such that the determination in Step 600 is "NO", the corrected target air-fuel ratio for performing feedback control for the air-fuel ratio is calculated in Step 602 and feedback control for the air-fuel ratio is performed in Step 604 based on the that corrected target air-fuel ratio. On the other hand, when the map shown in FIG. 21 has already been created such that the determination in Step 600 is "YES", Step 602 is not performed even when the operation angle of the intake valve 2 has changed from the point at which the map was created, such that the feedback control for the air-fuel ratio is performed in Step 604 based on the map that was already created.

According to the embodiment of the invention, the fuel injection quantity is calculated based on the following Equations (3) and (4).

Fuel injection quantity=Basic injection quantity+ Feedback correction quantity (3)

Feedback correction quantity=a×f+b×g (4);

wherein a and b denote gain, and f and g denote coefficients of the corrected target air-fuel ratio and the sensor target air-fuel ratio.

That is, when the corrected target air-fuel ratio shifts over to the lean side, for example, the feedback correction quantity is reduced such that the fuel injection quantity is corrected with a reduction. On the other hand, when the corrected target air-fuel ratio shifts over to the rich side, for example, the feedback correction quantity is increased such that the fuel injection quantity is corrected with an increase.

According to this embodiment of the invention, therefore, the target air-fuel ratio is corrected based on the operation angle of the intake valve 2, i.e., the corrected target air-fuel ratio is changed based on the operation angle of the intake valve 2. Alternatively, according to a modification of the embodiment (refer to FIG. 21), any one, or all, of the coefficients relating to the air-fuel ratio feedback control may be corrected by the operation angle of the intake valve 2. These coefficients include the aforementioned corrected target air-fuel ratio, as well as the gain a and b, and the sensor target air-fuel ratio and the like.

Alternatively, according to another modification of the ninth embodiment of the invention, the fuel injection quan tity is calculated based on the following Equations (5) and (6).

Fuel injection quantity=Basic injection quantity+ Increase correction quantity+Feedback correction quantity   (5)

Feedback correction quantity=$A \times P + \Sigma A \times I + (dA/dt) \times D$   (6);

wherein A denotes the difference between the corrected target air-fuel ratio and the sensor target air-fuel ratio, and P, I and D denote the gain increase correction quantity which includes a correction quantity for minimizing an increase in exhaust temperature and a correction quantity when the engine coolant temperature is low.

According to a modification of the embodiment, it is possible to correct any one, or all, of the coefficients relating to air-fuel ratio feedback control by the operation angle of the intake valve 2. These coefficients include the aforementioned corrected target air-fuel ratio, as well as the gains P, I and D, and the difference A between the corrected target air-fuel ratio and the sensor target air-fuel ratio and the like.

According to the embodiment or the modification thereof, a predetermined coefficient relating to the air-fuel ratio feedback control is corrected by the operation angle of the intake valve 2. More specifically, the target air-fuel ratio is calculated based on the operation angle of the intake valve 2, as shown in FIG. 21. For example, in the event that the overall air-fuel ratio shifts over to the rich side as a result of the sensor target air-fuel ratio not being set appropriately due to the fact that the sensor 57 is not sufficiently exposed to the gas, the corrected target air-fuel ratio is calculated so as to shift the overall air-fuel ratio toward the lean side.

Also according to the ninth embodiment or a modification thereof, when the actual operation angle of the intake valve 2 is off from the target operation angle thereof, there is a tendency for the sensor target air-fuel ratio, which is set based on a value output by the sensor 57, to be far off from the appropriate target air-fuel ratio the smaller the operation angle of the intake valve 2. In view of this fact, as is shown in FIG. 21, for example, the correction amount for the target air-fuel ratio increases, i.e., the difference between the corrected target air-fuel ratio and the stoichiometric air-fuel ratio increases, the smaller the operation angle of the intake valve 2. This enables the value of the target air-fuel ratio to be made more appropriate than when the target air-fuel ratio is not corrected based on the operation angle of the intake valve 2. That is, the control apparatus is capable of executing appropriate air-fuel ratio feedback control even when the sensor 57 is not sufficiently exposed to the exhaust gas, i.e., even when the sensor target air-fuel ratio calculated from a value output by the sensor 57 is not an appropriate target air-fuel ratio.

More specifically, when a variation in the air-fuel ratio between cylinders is detected in Steps 501 and 502, the control apparatus first calculates a target air-fuel ratio (corrects it to an appropriate target air-fuel ratio) in Step 602, and then calculates the relationship L2 between the target air-fuel ratio and the operation angle of an intake valve based on that target air-fuel ratio and the operation angle of the intake valve at that time in Step 603. The control apparatus then calculates, when the operation angle of the intake valve changes, the appropriate target air-fuel ratio after the intake valve operation angle change based on the operation angle of the intake valve 2 after the change and that relationship L2.

Hereinafter an another embodiment of a control apparatus for an internal combustion engine according to the invention will be described. The configuration of this embodiment is substantially the same as those of the aforementioned embodiments. Accordingly, this embodiment has substantially the same effects and advantages as those embodiments.

Figure 22:
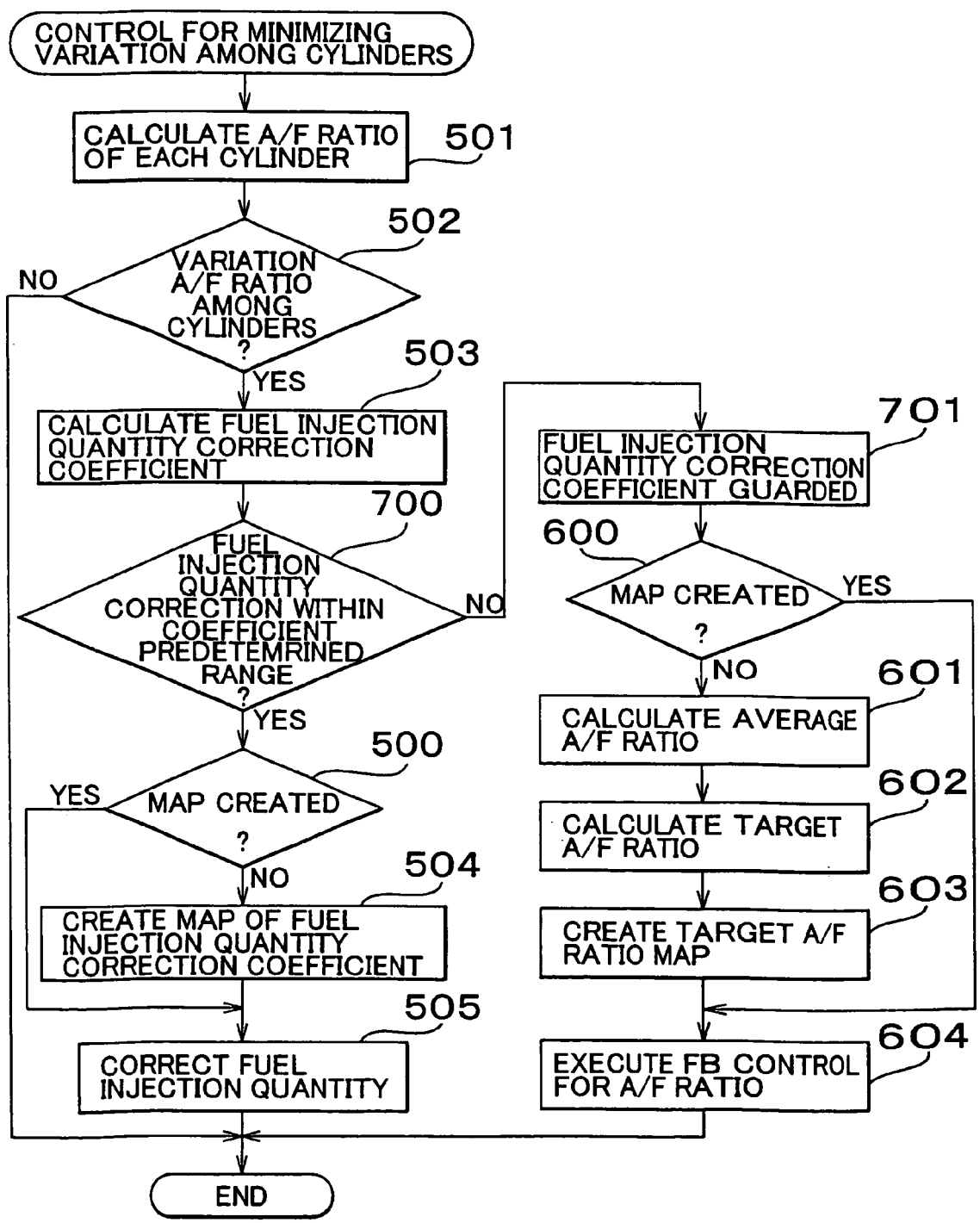
FIG. 22 is a flow chart showing a method for controlling so as to minimize variation between cylinders according to a tenth embodiment.

A routine according to a method for controlling to reduce variation among cylinders, according to the embodiment, is performed at predetermined intervals. As shown in FIG. 22, when this routine starts, the air-fuel ratio of each of the cylinders Nos. 1 through 4when the engine is in a constant state such as idling, for example, is first calculated in Step 501 based on the value output from the air-fuel ratio sensor 57, just as in the foregoing embodiments. Then in Step 502 it is determined whether there is a variation in the air-fuel ratio between the cylinders, just as in the other embodiments. If the determination is "YES", the process proceeds to Step 503. If the variation in the air-fuel ratio between the cylinders is less than a predetermined value, then the routine ends. If the variation in the air-fuel ratio between cylinders is equal to or greater than the predetermined value, then the routine proceeds to Step 503.

In Step 503, the fuel injection quantity correction coefficient for each of the cylinders Nos. 1 through 4 is calculated based on the calculated air-fuel ratios of each of the cylinders Nos. 1 through 4, respectively, just as in the former embodiments. For example, when the actual air-fuel ratio varies on the rich side with respect to the target air-fuel ratio, a fuel injection amount correction coefficient is calculated which has a relatively small value so as to correct with a decrease the fuel injection amount. On the other hand, when the actual air-fuel ratio varies on the lean side with respect to the target air-fuel ratio, a fuel injection amount correction coefficient is calculated which has a relatively large value so as to correct with an increase the fuel injection amount. Next in Step 700, it is determined whether the fuel injection quantity correction coefficient calculated in Step 503 is within a predetermined value range. When the fuel injection quantity correction coefficient is too small, the process proceeds to Step 701. The routine also proceeds to Step 701 when the fuel injection quantity correction coefficient is too large. On the other hand, when the fuel injection quantity correction coefficient falls within the predetermined value range, the process proceeds to Step 500.

In Step 500, it is determined whether a fuel injection quantity correction coefficient map has already been created. When the determination is "NO", the process proceeds to Step 504. When the determination is "YES", the process proceeds to Step 505. In Step 504, a fuel injection quantity correction coefficient map, which shows the relationship between the fuel injection quantity correction coefficient and the operation angle of the intake valve 2, as shown in FIG. 19, is created based on the fuel injection amount quantity correction coefficient calculated in Step 503 and the operation angle of the intake valve 2 at that time, just as in the former embodiments. In Step 505, the fuel injection quantity for each of the cylinders Nos. 1 through 4 is corrected. In other words, when the map shown in FIG. 19 has not been created such that the determination in Step 500 is "NO", the fuel injection quantity is corrected based on the fuel injection quantity correction coefficient calculated in Step 503. On the other hand, when the map shown in FIG. 19 has already been created such that the determination in Step 500 is "YES", the fuel injection quantity is corrected based on the map that was already created.

In Step 701, the fuel injection quantity correction coefficient calculated in Step 503 is guarded by a predetermined upper limit and lower limit. Then in Step 600 it is determined whether a target air-fuel ratio map has already been created, just as in the former embodiments. If the determination is "YES", the process proceeds to Step 604. If the determination is "NO", then the process proceeds to Step 601. In Step 601, a mean air-fuel ratio for all of the cylinders Nos. 1 through 4 is calculated, just as in the former embodiments. Then in Step 602, a corrected target air-fuel ratio is calculated based on the sensor target air-fuel ratio and, for example, the stoichiometric air-fuel ratio, and the mean air-fuel ratio calculated in Step 601, just as in the former embodiment. Next, in Step 603, a target air-fuel ratio map, which shows the relationship of the corrected target air-fuel ratio and the operation angle of the intake valve 2, is created based on the corrected target air-fuel ratio calculated in Step 602 and the operation angle of the intake valve 2 at that time, just as in the ninth embodiment.

In Step 604, air-fuel ratio feedback control is performed, just as in the ninth embodiment. Because the fuel injection quantity correction coefficient is guarded in Step 701, as described above, the correction amount of the fuel injection quantity will not become very large.

According to the aforementioned embodiment, the target air-fuel ratio is corrected by the operation angle of the intake valve 2, i.e., the corrected target air-fuel ratio is changed by the operation angle of the intake valve 2. Alternatively, according to a modification of the embodiment (refer to FIG. 21), any one, or all, of the coefficients relating to the air-fuel ratio feedback control may be corrected by the operation angle of the intake valve 2, just as in the modification of the ninth embodiment.

Also, according to another modification of the embodiment, the fuel injection quantity is calculated based on the foregoing Expressions (5) and (6), just as in the other modification of the embodiment. Moreover according to a modification of the embodiment, any one, or all, of the coefficients relating to the air-fuel ratio feedback control can be calculated based on the operation angle of the intake valve 2, just as in the modification of the ninth embodiment.

The embodiment has substantially the same effects and advantages as the eighth and ninth embodiments. Moreover, according to the embodiment, in consideration of the possibility that a large torque variation may be generated if the correction amount of the fuel injection quantity is large, when it is determined in Step 700 that the calculated correction amount of the fuel injection quantity is small, the control apparatus individually corrects the fuel injection quantity in each of the cylinders Nos. 1 through 4 in Step 505, thereby minimizing the variation in the air-fuel ratio among the cylinders. On the other hand, when it is determined in Step 700 that the calculated correction amount of the fuel injection quantity is large, the correction amount of the fuel injection quantity is guarded by a predetermined value in Step 701. A corrected target air-fuel ratio is then calculated in Steps 602 and 603 and the fuel injection quantity of all of the cylinders Nos. 1 through 4 are uniformly corrected by that corrected target air-fuel ratio in Step 604. That is, air-fuel ratio feedback control is performed, such that torque variation is reduced while the air-fuel ratio is able to be appropriately controlled.

The aforementioned eighth, ninth and tenth embodiments may be applied not only in the case in which the valve lift amount of the intake valve 2 is set as shown by the solid line in FIG. 6, but also in the case in which the valve lift amount of the intake valve 2 is set as shown by the chain line in FIG. 6, as well as in the case in which the closing timing of the intake valve 2 is retarded.

According to the invention, by making the throttle valve opening amount in one cylinder when the exhaust gas air-fuel ratio of that cylinder is calculated and the throttle valve opening amount in another cylinder when the exhaust gas air-fuel ratio of that cylinder is calculated substantially the same, the intake air amount introduced into the one cylinder when the exhaust gas air-fuel ratio of that cylinder is calculated and the intake air amount introduced into the other cylinder when the exhaust gas air-fuel ratio of that cylinder is calculated are able to made the same. Furthermore, while a variation in the air-fuel ratio among cylinders can be reduced just as in the control apparatus for a multi-cylinder internal combustion engine disclosed in Japanese Patent Application Laid-Open Publication No. 6-213044, a pulsation generated by a variation in torque among cylinders when there is a variation in fuel injection quantity among cylinders can be avoided. That is, a variation in air-fuel ratio among cylinders as well as a variation in torque among cylinders can be reduced.

According to an aspect of the invention, a variation in the intake air amount among cylinders can be reduced without generating a variation in torque among cylinders even if there is a variation in the fuel injection quantity between cylinders.

According to another aspect of the invention, a variation in the intake air amount between cylinders can be minimized without generating a variation in torque between cylinders even if there is a variation in the fuel injection quantity between cylinders.

According to another aspect of the invention, a variation in the operation angle of the intake valve among cylinders can be reduced without generating a variation in torque among cylinders even if there is a variation in the fuel injection quantity among cylinders.

According to another aspect of the invention, by using a neural network, a variation among cylinders can be reduced more effectively than without using a neural network.

According to another aspect of the invention, a variation in the air-fuel ratio between cylinders is able to be controlled more appropriately than with the control apparatus for a multi-cylinder internal combustion engine disclosed in Japanese Patent Application Laid-Open Publication No. 6-213044, in which a variation between cylinders is not able to be minimized based on the amount of valve overlap of the intake valve and the exhaust valve, when the amount of valve overlap of the intake valve and the exhaust valve is able to be changed. In other words, it is possible to appropriately control the variation in the air-fuel ratio among the cylinders.

According to another aspect of the invention, a variation in the air-fuel ratio among cylinders can be controlled more appropriately than with the control apparatus for a multi-cylinder internal combustion engine disclosed in Japanese Patent Application Laid-Open Publication No. 6-213044, in which a variation among cylinders cannot be reduced based on the operation angle of the intake valve, when the operation angle of the intake valve can be changed. In other words, it is possible to appropriately control the variation in the air-fuel ratio among the cylinders.

According to another aspect of the invention, a variation in the air-fuel ration between cylinders is able to be controlled more appropriately than when the fuel injection quantity is not able to be corrected based on the operation angle of the intake valve.

According to another aspect of the invention, a value of the target air-fuel ratio can be set to a more appropriate value than when the target air-fuel ratio is not able to be corrected by the operation angle of the intake valve. That is, the control apparatus is capable of executing appropriate air-fuel ratio feedback control even when a sensor is not sufficiently exposed to the exhaust gas, i.e., even when a target air-fuel ratio calculated from a value output by a sensor is not an appropriate target air-fuel ratio.

According to another aspect of the invention, a variation in air-fuel ratio among cylinders as well as a variation in torque among cylinders can be minimized.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control apparatus for a multi-cylinder internal combustion engine including a plurality of cylinders, the control apparatus comprising a controller that:
   calculates an exhaust gas air-fuel ratio of a cylinder when valve opening characteristics of an intake valve and an exhaust valve of each of the cylinders of the internal combustion engine are set such that an amount of an intake air introduced into the cylinder is not limited by the valve opening characteristics; and
   reduces a variation in a fuel injection quantity among the plurality of cylinders on the basis of the calculated exhaust gas air-fuel ratio of each of the cylinders.

2. A control apparatus according to claim 1, wherein the controller calculates the exhaust gas air-fuel ratio of each of the cylinders when the valve opening characteristics of the intake valve and the exhaust valve of each cylinder are set such that the amount of the intake air introduced into each cylinder of the internal combustion engine is limited by a throttle valve opening amount.

3. A control apparatus according to claim 1, wherein the controller:
   calculates the exhaust gas air-fuel ratio of the cylinder when the valve opening characteristics of the intake valve and the exhaust valve are set such that the amount of the intake air introduced into the cylinder is limited by the valve opening characteristics after reducing the variation in the fuel injection quantity among the plurality of cylinders; and
   reduces a variation in the valve opening characteristics of the intake valve and the exhaust valve among the plurality of cylinders on the basis of the calculated exhaust gas air-fuel ratio of the cylinder.

4. A control apparatus according to claim 3, wherein the controller calculates the exhaust gas air-fuel ratio of the cylinder when the valve opening characteristics of the intake valve and the exhaust valve are set such that the amount of the intake air introduced into the cylinder is not limited by a throttle valve opening amount, but is limited by the valve opening characteristics of the intake valve and the exhaust valve after reducing the variation in the fuel injection quantity among the plurality of cylinders.

5. A control apparatus according to claim 1, wherein a neural network is used to reduce the variation among the plurality of cylinders.

6. A control apparatus for a multi-cylinder internal combustion engine including a plurality of cylinders, the control apparatus comprising a controller that:
   calculates an exhaust gas air-fuel ratio of each of the cylinders when an operation angle of an intake valve of each cylinder of the internal combustion engine is set to a predetermined angle; and
   reduces a variation in a fuel injection quantity among the plurality of cylinders on the basis of the calculated exhaust gas air-fuel ratio of each of the cylinders.

7. A control apparatus according to claim 6, wherein the controller calculates the exhaust gas air-fuel ratio of each of the cylinders when the operation angle of the intake valve is set such that an amount of intake air introduced into a cylinder of the internal combustion engine is not limited by the operation angle of the intake valve.

8. A control apparatus according to claim 7, wherein the controller calculates the exhaust gas air-fuel ratio of each of the cylinders when the amount of the intake air introduced into each cylinder of the internal combustion engine is not limited by the operation angle of the intake valve, but is limited by a throttle valve opening amount.

9. A control apparatus according to claim 6, wherein the controller calculates the exhaust gas air-fuel ratio of each of the cylinders when the operation angle of the intake valve is set to a maximum operation angle.

10. A control apparatus according to claim 6, wherein the controller:
    calculates the exhaust gas air-fuel ratio of each of the cylinders when valve opening characteristics of the intake valve and an exhaust valve are set such that an amount of intake air introduced into each of the cylinders is limited by the valve opening characteristics after reducing the variation in the fuel injection quantity among the plurality of cylinders; and
    reduces a variation in the valve opening characteristics of the intake valve and the exhaust valve among the plurality of cylinders on the basis of the calculated exhaust gas air-fuel ratio of each of the cylinders.

11. A control apparatus according to claim 6, wherein the controller:
    calculates the exhaust gas air-fuel ratio of each of the cylinders when the operation angle of the intake valve is set to an operation angle that is smaller than the predetermined angle after reducing the variation in the fuel injection quantity among the plurality of cylinders; and
    reduces a variation in the amount of the intake air among the plurality of cylinders on the basis of the calculated exhaust gas air-fuel ratio of each of the cylinders.

12. A control apparatus according to claim 6, wherein the controller:
    calculates the exhaust gas air-fuel ratio of each of the cylinders when the operation angle of the intake valve is set to an operation angle that is smaller than the predetermined angle after reducing the variation in the fuel injection quantity among the plurality of cylinders; and
    reduces a variation in the operation angle of the intake valve among the cylinders on the basis of the calculated exhaust gas air-fuel ratio of each of the cylinders.

13. A control apparatus for a multi-cylinder internal combustion engine, the control apparatus comprising a controller that:
    calculates an exhaust gas air-fuel ratio of each of the cylinders when a valve overlap amount of an intake valve and an exhaust valve of each of the cylinders of the internal combustion engine is set to a predetermined amount; and
    reduces a variation in a fuel injection quantity among the plurality of cylinders on the basis of the calculated exhaust gas air-fuel ratio of each of the cylinders.

14. A control apparatus according to claim 13, wherein the controller calculates the exhaust gas air-fuel ratio of each of the cylinders when the valve overlap amount of the intake valve and the exhaust valve is set such that an amount of the intake air introduced into each of the cylinders is not limited by the valve overlap amount.

15. A control apparatus according to claim 14, wherein the controller calculates the exhaust gas air-fuel ratio of each of the cylinders when the valve overlap amount of the intake valve and the exhaust valve is set such that the amount of the intake air introduced into each of the cylinders is not limited by the valve overlap amount, but is limited by a throttle valve opening amount.

16. A control apparatus according to claim 13, wherein the controller calculates the exhaust gas air-fuel ratio of each of the cylinders when the valve overlap amount of the intake valve and the exhaust valve is set to a minimum amount.

17. A method of controlling a multi-cylinder internal combustion engine including a plurality of cylinders, comprising the steps of:

calculating an exhaust gas air-fuel ratio of a cylinder when valve opening characteristics of an intake valve and an exhaust valve of each of the cylinders of the internal combustion engine are set such that an amount of an intake air introduced into the cylinder is not limited by the valve opening characteristics; and reducing a variation in a fuel injection quantity among the plurality of cylinders on the basis of the calculated exhaust gas air-fuel ratio of each of the cylinders.

18. A method of controlling a multi-cylinder internal combustion engine including a plurality of cylinders, comprising the steps of:

calculating an exhaust gas air-fuel ratio of each of the cylinders when an operation angle of an intake valve of each of the cylinders of the internal combustion engine is set to a predetermined angle; and reducing a variation in a fuel injection quantity among the plurality of cylinders on the basis of the calculated exhaust gas air-fuel ratio of each of the cylinders.

19. A method of controlling a multi-cylinder internal combustion engine including a plurality of cylinders, comprising the steps of:

calculating an exhaust gas air-fuel ratio of each of the cylinders when a valve overlap amount of an intake valve and an exhaust valve of each of the cylinders of the internal combustion engine is set to a predetermined amount; and reducing a variation in a fuel injection quantity among the plurality of cylinders on the basis of the calculated exhaust gas air-fuel ratio of each of the cylinders.

* * * * *